United States Patent
Harada et al.

(10) Patent No.: US 9,896,530 B2
(45) Date of Patent: Feb. 20, 2018

(54) COPOLYMER, COLORING MATERIAL DISPERSION, INK, AND INK STORE CONTAINER

(71) Applicants: Shigeyuki Harada, Shizuoka (JP); Kazukiyo Nagai, Shizuoka (JP); Yuusuke Koizuka, Shizuoka (JP); Tomoyuki Shimada, Shizuoka (JP); Takuya Yamazaki, Shizuoka (JP); Koichiro Oyama, Kanagawa (JP); Akiyoshi Sabu, Shizuoka (JP); Akihiko Matsuyama, Shizuoka (JP); Yoshiki Yanagawa, Shizuoka (JP)

(72) Inventors: Shigeyuki Harada, Shizuoka (JP); Kazukiyo Nagai, Shizuoka (JP); Yuusuke Koizuka, Shizuoka (JP); Tomoyuki Shimada, Shizuoka (JP); Takuya Yamazaki, Shizuoka (JP); Koichiro Oyama, Kanagawa (JP); Akiyoshi Sabu, Shizuoka (JP); Akihiko Matsuyama, Shizuoka (JP); Yoshiki Yanagawa, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/366,526

(22) Filed: Dec. 1, 2016

(65) Prior Publication Data
US 2017/0158794 A1    Jun. 8, 2017

(30) Foreign Application Priority Data
Dec. 2, 2015   (JP) ................. 2015-235921

(51) Int. Cl.
C08F 222/22    (2006.01)
C08F 220/34    (2006.01)
C09D 11/107    (2014.01)

(52) U.S. Cl.
CPC .......... C08F 222/22 (2013.01); C08F 220/34 (2013.01); C09D 11/107 (2013.01)

(58) Field of Classification Search
CPC ..... C08F 222/22; C08F 220/34; C09D 11/107
USPC ........................................................ 524/553
See application file for complete search history.

(56) References Cited

U.S. PATENT DOCUMENTS

| | | | |
|---|---|---|---|
| 8,960,885 B2 | 2/2015 | Katoh et al. | |
| 8,974,895 B2 | 3/2015 | Naruse et al. | |
| 8,998,400 B2 * | 4/2015 | Harada ............... | C08F 222/16 347/100 |
| 9,034,091 B2 | 5/2015 | Matsuyama et al. | |
| 9,217,089 B2 | 12/2015 | Nagai et al. | |
| 9,234,110 B2 | 1/2016 | Katoh et al. | |
| 9,359,522 B2 | 6/2016 | Matsuyama et al. | |
| 9,441,129 B2 | 9/2016 | Katoh et al. | |
| 2005/0206703 A1 | 9/2005 | Guo et al. | |
| 2007/0100023 A1 | 5/2007 | Burns et al. | |
| 2007/0100024 A1 | 5/2007 | Gu et al. | |
| 2014/0055520 A1 | 2/2014 | Inumaru et al. | |
| 2014/0072779 A1 | 3/2014 | Matsuyama et al. | |
| 2014/0120331 A1 | 5/2014 | Koizuka et al. | |
| 2014/0141209 A1 | 5/2014 | Koizuka et al. | |
| 2015/0064425 A1 | 3/2015 | Matsuyama et al. | |
| 2015/0109382 A1 | 4/2015 | Naruse et al. | |
| 2015/0116421 A1 | 4/2015 | Nonogaki et al. | |
| 2015/0247049 A1 | 9/2015 | Matsuyama et al. | |

(Continued)

FOREIGN PATENT DOCUMENTS

| | | |
|---|---|---|
| JP | 2867491 | 12/1998 |
| JP | 2008-536963 | 9/2008 |

(Continued)

OTHER PUBLICATIONS

U.S. Appl. No. 15/174,063, filed Jun. 6, 2016.

*Primary Examiner* — Ling Choi
*Assistant Examiner* — Ronald Grinsted
(74) *Attorney, Agent, or Firm* — Oblon, McClelland, Maier & Neustadt, L.L.P.

(57) ABSTRACT

A copolymer including a structural unit represented by General Formula (1) below and a structural unit represented by General Formula (2) below,

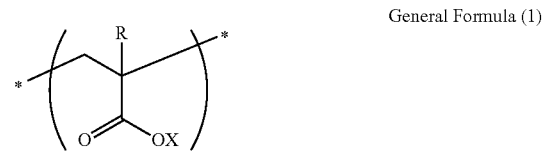

General Formula (1)

where, in General Formula (1), R is a hydrogen atom or a methyl group and X is a hydrogen atom or a cation,

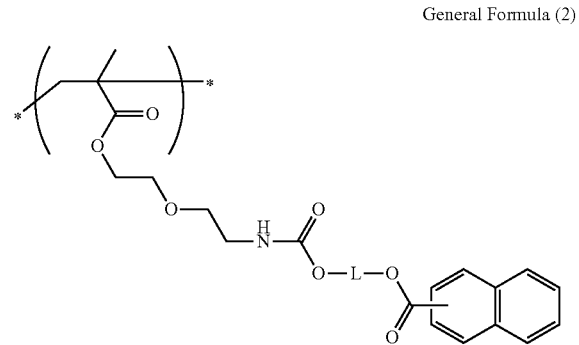

General Formula (2)

where, in General Formula (2), L is an alkylene group having 2 or more but 18 or less carbon atoms.

10 Claims, 4 Drawing Sheets

(56) References Cited

U.S. PATENT DOCUMENTS

| | | |
|---|---|---|
| 2015/0252203 A1 | 9/2015 | Matsuyama et al. |
| 2015/0291817 A1 | 10/2015 | Katoh et al. |
| 2015/0307734 A1 | 10/2015 | Nonogaki et al. |
| 2015/0376425 A1 | 12/2015 | Hakiri et al. |
| 2016/0017075 A1 | 1/2016 | Harada et al. |
| 2016/0032037 A1 | 2/2016 | Harada et al. |
| 2016/0075892 A1 | 3/2016 | Harada et al. |
| 2016/0102162 A1 | 4/2016 | Harada et al. |
| 2016/0130452 A1 | 5/2016 | Katoh et al. |
| 2016/0168292 A1 | 6/2016 | Fukuoka et al. |
| 2016/0222234 A1 | 8/2016 | Matsuyama et al. |

FOREIGN PATENT DOCUMENTS

| | | |
|---|---|---|
| JP | 2009-229499 | 10/2009 |
| JP | 4687110 | 2/2011 |
| JP | 4722462 | 4/2011 |
| JP | 2011-105866 | 6/2011 |
| JP | 2012-052027 | 3/2012 |
| JP | 4956666 | 3/2012 |
| JP | 5001291 | 5/2012 |
| JP | 2016-196621 | 11/2016 |

\* cited by examiner

COPOLYMER, COLORING MATERIAL DISPERSION, INK, AND INK STORE CONTAINER

CROSS-REFERENCE TO RELATED APPLICATIONS

The present application claims priority under 35 U.S.C. § 119 to Japanese Patent Application No. 2015-235921, filed Dec. 2, 2015. The contents of which are incorporated herein by reference in their entirety.

BACKGROUND OF THE INVENTION

Field of the Invention

The present disclosure relates to copolymers, coloring material dispersions, inks and ink stored containers.

Description of the Related Art

Compared with other printing methods, inkjet printing methods have simple processes, can be easily accommodated to full-color operations, and can provide high-resolution images even when used on apparatuses having simple configurations. Therefore, the inkjet printing methods are spreading to personal and office use and commercial printing and industrial printing fields.

In the inkjet printing methods, aqueous ink compositions using aqueous dyes as coloring materials have been used. The aqueous ink compositions however have a problem that the aqueous ink composition using the aqueous dye lacks in water resistance and lightfastness. Accordingly, pigment inks using water-insoluble pigments replacing the aqueous dyes have been developed.

When the pigment ink is printed on plain paper, the pigment penetrates into the paper without being remained on a surface of the paper, and therefore a density of the pigment on the surface of the paper is low, leading to a low image density. The image density increases, if a concentration of the pigment in the ink increases. However, the ink having a high pigment concentration has problems that a viscosity of the ink increases to deteriorate ejection stability.

To solve the above-described problems, for example, proposed is an inkjet ink including a liquid vehicle, a coloring material, and a polymer including at least one functional group having a certain calcium index value (see, e.g., Japanese Patent No. 5001291).

When an image having excellent resolution and vividness on various print media, especially media having low permeability or nonpermeable films, such as coated paper and art paper, moreover, there is a problem that beading (unevenness) tends to occur.

In order to solve the above-described problem, for example, proposed is a method where rheology is an ink is changed with a change of pH using a pH-responsive polymer including a plurality of hydrophilic segments arranged at side chains, and a plurality of pH-responsive segments which change between hydrophilic nature and hydrophobic nature depending on a value of pH (see, e.g., Japanese Unexamined Patent Application Publication No. 2012-52027).

Moreover, aqueous pigment inks used for the inkjet printing method and for writing instruments are different from aqueous dye inks each prepared by dissolving a dye in water, and the pigments, which are insoluble in water, in the aqueous pigment inks need to be stably dispersed in water over a long period. Therefore, various pigment dispersing agents have been developed.

For example, proposed as a pigment dispersing agent is a graft polymer including an aromatic ring at a side chain (see, e.g., Japanese Unexamined Patent Application Publication No. 2011-105866).

SUMMARY OF THE INVENTION

The present disclosure has an object to provide a copolymer effective as a binder resin of an ink or a pigment-dispersing resin.

As means for solving the above-mentioned problems, the copolymer of the present disclosure includes:
a structural unit represented by General Formula (1) below; and
a structural unit represented by General Formula (2) below,

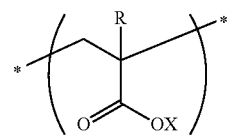

General Formula (1)

where, in General Formula (1), R is a hydrogen atom or a methyl group and X is a hydrogen atom or a cation,

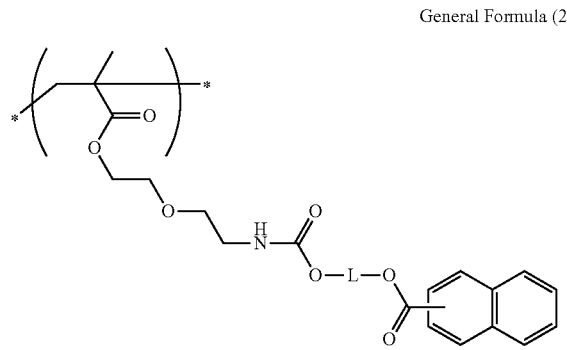

General Formula (2)

where, in General Formula (2), L is an alkylene group having 2 or more but 18 or less carbon atoms.

The present disclosure can provide a copolymer effective as a binder resin of an ink or a pigment-dispersing resin.

DESCRIPTION OF THE EMBODIMENTS (Copolymer)

Figure 1:
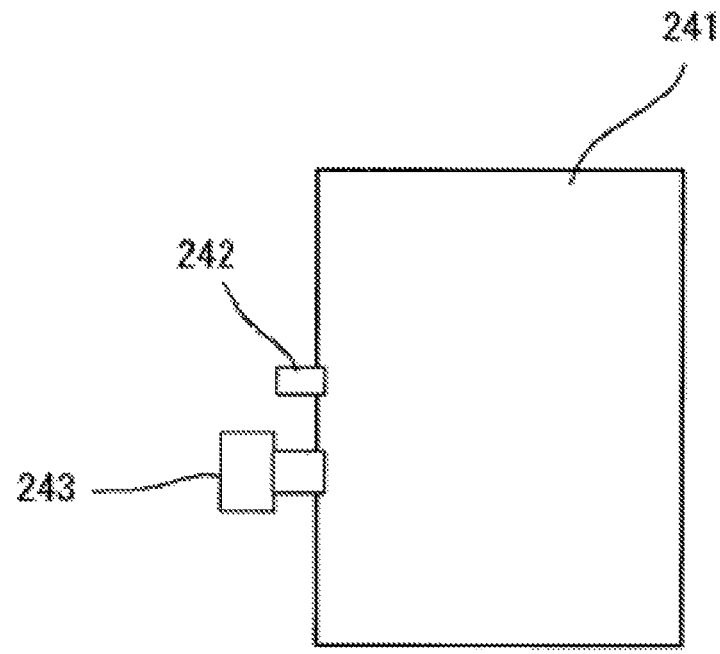
FIG. 1 is a schematic view illustrating one example of an ink stored container of the present disclosure.

A copolymer of the present disclosure includes a structural unit represented by General Formula (1) below and a structural unit represented by General Formula (2) below, and may further include other structural units according to the necessity.

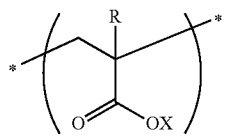

General Formula (1)

In General Formula (1), R is a hydrogen atom or a methyl group and X is a hydrogen atom or a cation.

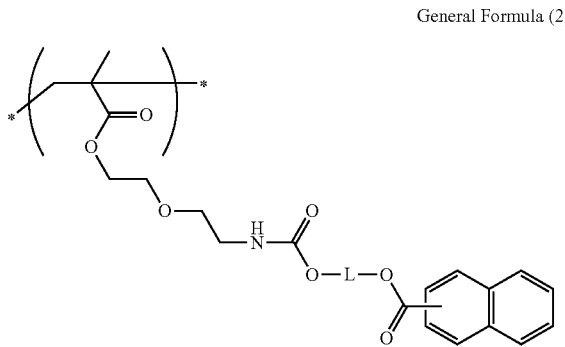

General Formula (2)

In General Formula (2), L is an alkylene group having 2 or more but 18 or less carbon atoms.

R in General Formula (1) is a hydrogen atom or a methyl group.

X in General Formula (1) is a hydrogen atom or a cation.

In the case where the X is a cation, oxygen being adjacent to the cation is present as an oxygen ion.

Examples of the cation include a sodium ion, a potassium ion, a lithium ion, a tetramethyl ammonium ion, a tetraethyl ammonium ion, a tetrapropyl ammonium ion, a tetrabutyl ammonium ion, a tetrapentyl ammonium ion, a tetrahexyl ammonium ion, a triethylmethyl ammonium ion, a tributylmethyl ammonium ion, a trioctylmethyl ammonium ion, a 2-hydroxyethyltrimethyl ammonium ion, a tris(2-hydroxyethyl)methyl ammonium ion, a propyltrimethyl ammonium ion, a hexyl trimethyl ammonium ion, an octyltrimethyl ammonium ion, a nonyl trimethyl ammonium ion, a decyl trimethyl ammonium ion, a dodecyl trimethyl ammonium ion, a tetradecyl trimethyl ammonium ion, a hexadecyl trimethyl ammonium ion, an octadecyl trimethyl ammonium ion, a didodecyldimethyl ammonium ion, a ditetradecyl dimethyl ammonium ion, a dihexadecyl dimethyl ammonium ion, a dioctadecyl dimethyl ammonium ion, an ethylhexadecyl dimethyl ammonium ion, an ammonium ion, a dimethyl ammonium ion, a trimethyl ammonium ion, a monoethyl ammonium ion, a diethyl ammonium ion, a triethyl ammonium ion, a monoethanol ammonium ion, a diethanol ammonium ion, a triethanol ammonium ion, a methyl ethanol ammonium ion, a methyl diethanol ammonium ion, a dimethyl ethanol ammonium ion, a monopropanol ammonium ion, a dipropanol ammonium ion, a tripropanol ammonium ion, an isopropanol ammonium ion, a morpholinium ion, a N-methylmorpholinium ion, a N-methyl-2-pyrrolidonium ion, and a 2-pyrrolidonium ion. Among the above-listed examples, tetraethyl ammonium ion is preferable.

L in General Formula (2) is an alkylene group having 2 or more but 18 or less carbon atoms, preferably an alkylene group having 2 or more but 16 or less carbon atoms, and more preferably an alkylene group having 2 or more but 12 or less carbon atoms.

Examples of the alkylene group include a methylene group, an ethylene group, a propylene group, a butylene group, a pentylene group, a hexylene group, a heptylene group, an octylene group, a dodecatylene group, and a hexadecatylene group.

The naphthyl group present at a terminal via L in General Formula (2) has an excellent pigment adsorption force owing to π-π stacking with a pigment that is a coloring material in the ink. Therefore, the pigment is immediately aggregated on a surface of a print medium by bringing the copolymer into contact with the pigment on the print medium, hence preventing beading (unevenness).

As understood from the descriptions above, the copolymer including the structural unit represented by General Formula (1) and the structural unit represented by General Formula (2) may be a main chain of a copolymer including a pendant group, such as, typically, a terminal naphthyl group hugged via L and a side chain carboxyl group. However, it is not naturally exclude a case part of the copolymer is included in a side chain.

For example, it is a commonly known fact that it is difficult to completely remove a secondary radical polymerization reaction that generates a branched structure.

When the copolymer of the present disclosure is used for preparing a coloring material dispersion, in which a pigment is dispersed in water, a dispersion having a stable dispersed state over a long period is obtained because the copolymer is easily adsorbed on a surface of the pigment and the copolymer has a high adsorption force of the pigment due to the presence of a naphthyl group at a terminal of the side chain of the copolymer.

A molar ratio (M1/M2) of the number of moles of the structural unit represented by General Formula (1) (M1) to the number of moles of the structural unit represented by General Formula (2) (M2) is preferably 0.1/1 or greater but 10/1 or less, more preferably 0.3/1 or greater but 5/1 or less, and particularly preferably 1/1 or greater but 3/1 or less, in view of an ability of adsorbing the pigment.

A mass ratio (the structural unit represented by General Formula (1)/the structural unit represented by General Formula (2)) of an amount (% by mass) of the structural unit represented by General Formula (1) to an amount (% by mass) of the structural unit represented by General Formula (2) is preferably 37/63 or greater but 98/2 or less, more preferably 54/46 or greater but 95/5 or less, and particularly preferably 66/34 or greater but 92/8 or less.

The number average molecular weight and the weight average molecular weight of the copolymer of the present disclosure both based on polystyrene conversion are preferably 500 or greater but 20,000 or less, and 1,500 or greater but 30,000 or less, respectively. The number average molecular weight and the weight average molecular weight can be measured by gel permeation chromatography (GPC) under conditions below.

Device: GPC-8020 (available from Tosoh Corporation)
Columns: TSK G2000HXL and G4000HXL (available from Tosoh Corporation)
Temperature: 40° C.
Solvent: tetrahydrofuran (THF)
Flow rate: 1.0 mL/min
The copolymer having a concentration of 0.5% by mass in an amount of 1 mL is injected to measure under the conditions above to obtain a molecular weight distribution of the copolymer. The number average molecular weight and weight average molecular weight of the copolymer are calculated from the molecular weight distribution using a molecular weight calibration curve prepared from monodisperse polystyrene standard samples.

The copolymer may further include structural units derived from other polymerizable monomers, other than the structural unit represented by General Formula (1) and the structural unit represented by General Formula (2).

The above-mentioned other polymerizable monomers are not particularly limited and may be appropriately selected depending on the intended purpose. Examples of the above-mentioned other polymerizable monomers include polymerizable hydrophobic monomers, polymerizable hydrophilic monomers, and polymerizable surfactants.

Examples of the polymerizable hydrophobic monomers include: unsaturated ethylene monomers including aromatic rings, such as α-methyl styrene, 4-t-butyl styrene, and 4-chloromethyl styrene; alkyl (meth)acrylates, such as methyl (meth)acrylate, ethyl (meth)acrylate, n-butyl (meth)acrylate, dimethyl maleate, dimethyl itaconate, dimethyl fumarate, lauryl(the number of carbon atoms: 12) (meth)acrylate, tridecyl(the number of carbon atoms: 13) (meth)acrylate, tetradecyl(the number of carbon atoms: 14) (meth)acrylate, pentadecyl(the number of carbon atoms: 15) (meth)acrylate, hexadecyl(the number of carbon atoms: 16) (meth)acrylate, heptadecyl(the number of carbon atoms: 17) (meth)acrylate, nonadecyl(the number of carbon atoms: 19) (meth)acrylate, eicosyl(the number of carbon atoms: 20) (meth)acrylate, heneicosyl(the number of carbon atoms: 21) (meth)acrylate, and docosyl(the number of carbon atoms: 22) (meth)acrylate; and unsaturated ethylene monomers including alkyl groups, such as 1-heptene, 3,3-dimethyl-1-pentene, 4,4-dimethyl-1-pentene, 3-methyl-1-hexene, 4-methyl-1-hexene, 5-methyl-1-hexene, 1-octene, 3,3-dimethyl-1-hexene, 3,4-dimethyl-1-hexene, 4,4-dimethyl-11-hexene, 1-nonene, 3,5,5-trimethyl-1-hexene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, and 1-docosene. The above-listed examples may be used alone or in combination.

Examples of the polymerizable hydrophilic monomers include: anionic unsaturated ethylene monomers, such as unsaturated ethylene monomers including maleic acid or a salt thereof, monomethyl maleate, itaconic acid, monomethyl itaconate, fumaric acid, 4-styrene sulfonic acid, 2-acrylamide-2-methylpropane sulfonic acid, phosphoric acid, phosphonic acid, alendronate or etidronic acid; and nonionic unsaturated ethylene monomers, such as 2-hydroxyethyl (meth)acrylate, diethylene glycol mono(meth)acrylate, triethylene glycol mono(meth)acrylate, tetraethylene glycol mono(meth)acrylate, polyethylene glycol mono(meth)acrylate, (meth)acryl amide, N-methylol (meth)acryl amide, N-vinylformamide, N-vinylacetoamide, N-vinylpyrrolidone, acryl amide, N,N-dimethyl acryl amide, N-t-butyl acryl amide, N-octyl acryl amide, and N-t-octyl acryl amide. The above-listed examples may be used alone or in combination.

The polymerizable hydrophobic monomers and polymerizable hydrophilic monomers may be used alone or in combination, and may be used in an amount of 5% by mass or greater but 100% by mass or less relative to a total amount of monomers constituting the structural unit represented by General Formula (1) and the structural unit represented by General Formula (2).

The polymerizable surfactant is an anionic surfactant or nonionic surfactant including, per molecule, at least one unsaturated double bond group that is radically polymerizable.

Examples of the anionic surfactant include a hydrocarbon compound including a sulfuric acid salt group, such as an ammonium sulfate group ($-SO_3-NH_4+$), and an allyl group ($-CH_2-CH=CH_2$), a hydrocarbon compound including a sulfuric acid salt group, such as an ammonium sulfate group ($-SO_3-NH_4+$) and a methacryl group [$-CO-C(CH_3)=CH_2$], and an aromatic hydrocarbon group including a sulfuric acid salt group, such as an ammonium sulfate group ($-SO_3-NH_4+$) and 1-propenyl group ($-CH=CH_2CH_3$).

Commercially available products can be used as the anionic surfactant. Examples of the commercially available products include: ELEMINOL JS-20 and RS-300 both available from Sanyo Chemical Industries, Ltd.; and Aqualon KH-10, Aqualon KH-1025, Aqualon KH-05, Aqualon HS-10, Aqualon HS-1025, Aqualon BC-0515, Aqualon BC-10, Aqualon BC-1025, Aqualon BC-20, and Aqualon BC-2020 all available from DKS Co, Ltd. The above-listed examples may be used alone or in combination.

Examples of the nonionic surfactant include a hydrocarbon compound including a 1-propenyl group ($-CH=CH_2CH_3$) and a polyoxyethylene group [$-(C_2H_4O)_n-H$], and an aromatic hydrocarbon compound.

Commercially available products can be used as the nonionic surfactant. Examples of the commercially available products include: Aqualon RN-20, Aqualon RN-2025, Aqualon RN-30, and Aqualon RN-50 available from DKS Co, Ltd.; and LATEMUL PD-104, LATEMUL PD-420, LATEMUL PD-430, LATEMUL PD-450 all available from Kao Corporation. The above-listed examples may be used alone or in combination.

An amount of the polymerizable surfactant is not particularly limited and may be appropriately selected depending on the intended purpose, but the amount of the polymerizable surfactant is preferably 0.1% by mass or greater but 10% by mass or less relative to a total amount of the monomers.

The copolymer is preferably a polymer prepared by polymerizing a compound represented by General Formula (3) below and a compound represented by General Formula (4) below.

General Formula (3)

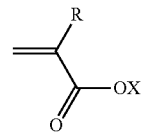

In General Formula (3), R is a hydrogen atom or a methyl group and X is a hydrogen atom or a cation.

General Formula (4)

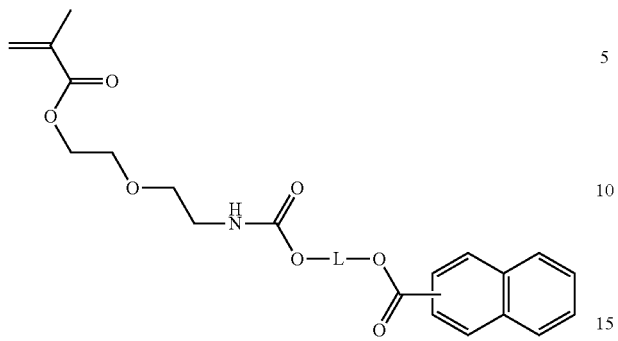

In General Formula (4), L is an alkylene group having 2 or more but 18 or less carbon atoms.

X in General Formula (3) can be the same as X in General Formula (1).

L in General Formula (4) can be the same as L in General Formula (2).

Examples of the compound represented by General Formula (3) include acrylic acid and methacrylic acid.

Examples of the compound represented by General Formula (4) include a compound represented by Structural Formula (4-1), a compound represented by Structural Formula (4-2), a compound represented by Structural Formula (4-3), and a compound represented by Structural Formula (4-4).

Structural Formula (4-1)

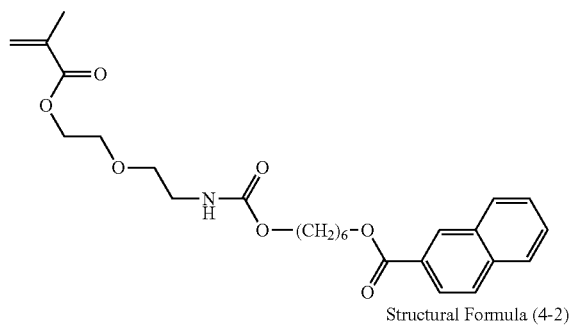

Structural Formula (4-2)

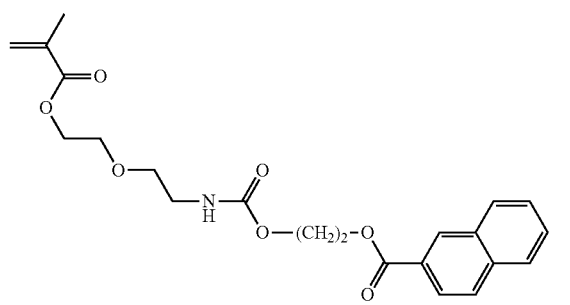

Structural Formula (4-3)

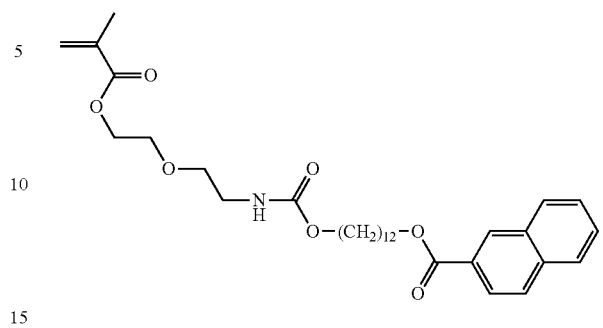

Structural Formula (4-4)

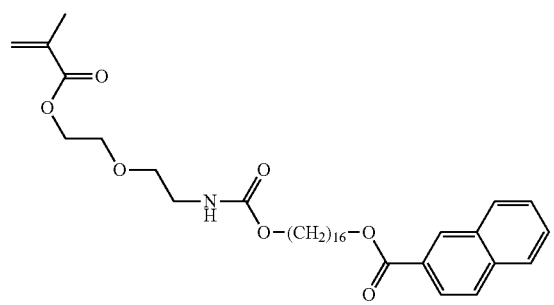

As demonstrated in a reaction formula below, the copolymer is obtained as follows. First, naphthalene carbonyl chloride (A-1) and an excessive amount of a diol compound (L in the following reaction formula is an alkylene group having 2 or greater but 18 or less carbon atoms) are allowed to react through a condensation reaction in the presence of an acid receptor, such as amine and pyridine, to obtain hydroxyalkyl naphthalene carbonate (A-2). Subsequently, the (A-2) was reacted with an isocyanate compound (A-3) to obtain a monomer (A-4). Thereafter, the monomer (A-4) is copolymerized with a (meth)acrylic monomer (A-5) (R in the following reaction formula is a hydrogen atom or a methyl group, and X therein is a hydrogen atom or a cation) in the presence of a radical polymerization initiator, to obtain a copolymer (A-6) of the present disclosure.

Examples of the polymerization method include a solution polymerization method and an emulsion polymerization method.

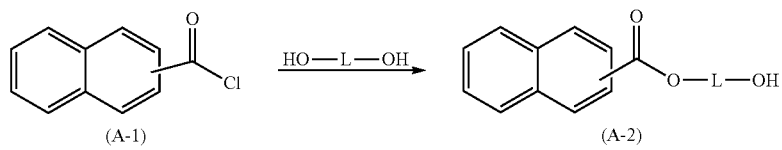

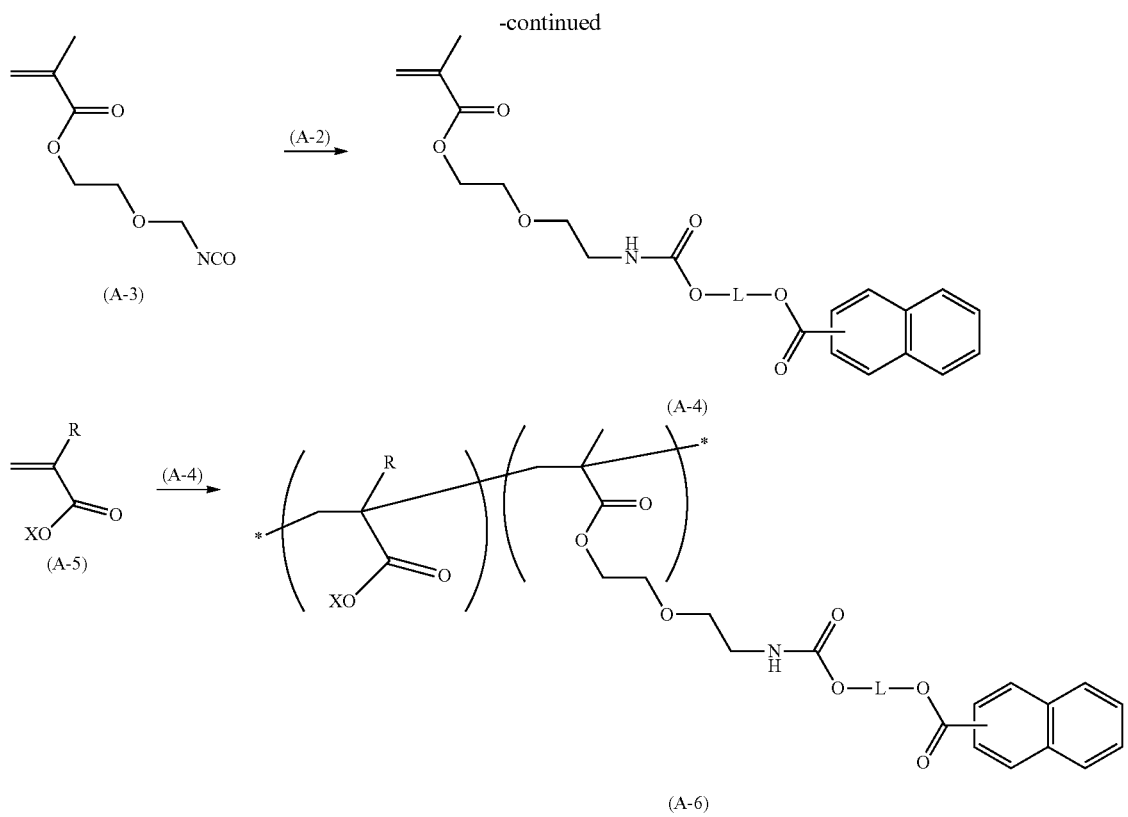

The radical polymerization initiator is not particularly limited and may be appropriately selected depending on the intended purpose. Examples of the radical polymerization initiator include peroxyketal, hydroperoxide, dialkyl peroxide, diacyl peroxide, peroxy dicarbonate, peroxy ester, cyano-based azobisisobutyronitrile, azobis(2-methylbutyronitrile), azobis(2,2'-isovaleronitrile), and non-cyano-based dimethyl-2,2'-azobisisobutylate. Among the above-listed examples, organic peroxide and an azo compound are preferable, and an azo compound is particularly preferable because a molecular weight can be easily controlled and a decomposition temperature is low.

An amount of the radical polymerization initiator is not particularly limited and may be appropriately selected depending on the intended purpose, but the amount of the radical polymerization initiator is preferably 1% by mass or greater but 10% by mass or less relative to a total amount of the polymerizable monomers.

An appropriate amount of a chain-transfer agent may be added in order to adjust a molecular weight of the polymer.

Examples of the chain-transfer agent include mercaptoacetic acid, mercaptopropionic acid, 2-propanethiol, 2-mercaptoethanol, thiophenol, dodecylmercaptan, 1-dodecanethiol, and thioglycerol.

A polymerization temperature is not particularly limited and may be appropriately selected depending on the intended purpose, but the polymerization temperature is preferably 50° C. or higher but 150° C. or lower, more preferably 60° C. or higher but 100° C. or lower.

A polymerization time is not particularly limited and may be appropriately selected depending on the intended purpose, but the polymerization time is preferably 3 hours or longer but 48 hours or shorter.

(Coloring Material Dispersion)

The coloring material dispersion includes water, a coloring material, and the copolymer of the present disclosure, and may further include other ingredients according to the necessity.

<Coloring Material>

A pigment or a dye can be used as the coloring material. The coloring material is preferably a pigment in view of the better absorption ability of the pigment to the copolymer as the coloring material than the dye, and water resistance and lightfastness.

The pigment is not particularly limited and may be appropriately selected depending on the intended purpose. Examples of the pigment include inorganic pigments and organic pigments for black or colors. The above-listed examples may be used alone or in combination.

Examples of the inorganic pigments include titanium oxide, iron oxide, calcium carbonate, barium sulfate, aluminium hydroxide, barium yellow, cadmium red, and chrome yellow, as well as carbon black produced by conventional methods, such as a contact method, a furnace method, and a thermal method.

Examples of the pigment for black include: carbon black (C.I. Pigment Black 7), such as furnace black, lamp black, acetylene black, and channel black; metals, such as copper and iron (C.I. Pigment Black 11); metal oxides such as titanium oxide; and organic pigments, such as aniline black (C.I. Pigment Black 1).

The carbon black is preferably carbon black, which is produced by a furnace method or a channel method, and has a primary particle diameter of 15 nm or greater but 40 nm or less, a BET specific surface area of 50 m$^2$/g or greater but 300 m$^2$/g or less, DBP oil absorption of 40 mL/100 g or greater but 150 mL/100 g or less, a volatile component of 0.5% or greater but 10% or less, and pH of 2 or higher but 9 or less.

Examples of the organic pigments include azo pigments (e.g., azo lake, insoluble azo pigments, condensed azo pigments, and chelate azo pigments), polycyclic pigments (e.g., phthalocyanine pigments, perylene pigments, perynone pigments, anthraquinone pigments, quinacridone pigments, dioxazine pigments, indigo pigments, thioindigo pigments, isoindolinone pigments, and quinophthalone pigments), dye chelates (e.g., base dye-based chelates, and acid dye-based chelates), nitro pigments, nitroso pigments, and aniline black. Among the above-listed pigments, pigments compatible with water are preferable.

Examples of the azo pigments include azo lake, insoluble azo pigments, condensed azo pigments, and chelate azo pigments.

Examples of the polycyclic pigments include phthalocyanine pigments, perylene pigments, perynone pigments, anthraquinone pigments, quinacridone pigments, dioxazine pigments, indigo pigments, thioindigo pigments, isoindolinone pigments, quinophthalone pigments, and rhodamine B lake pigments.

Examples of the dye chelates include base dye-based chelates, and acid dye-based chelates.

The pigment for yellow is not particularly limited and may be appropriately selected depending on the intended purpose. Examples of the pigment for yellow include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 120, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, C.I. Pigment Yellow 174, and C.I. Pigment Yellow 180.

The pigment for magenta is not particularly limited and may be appropriately selected depending on the intended purpose. Examples of the pigment for magenta include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1, C.I. Pigment Red 112, C.I. Pigment Red 122, C.I. Pigment Red 123, C.I. Pigment Red 146, C.I. Pigment Red 168, C.I. Pigment Red 176, C.I. Pigment Red 184, C.I. Pigment Red 185, C.I. Pigment Red 202, and Pigment Violet 19.

The pigment for cyan is not particularly limited and may be appropriately selected depending on the intended purpose. Examples of the pigment for cyan include C.I. Pigment Blue 1, C.I. Pigment Blue 2, C.I. Pigment Blue 3, C.I. Pigment Blue 15, C.I. Pigment Blue 15:3, C.I. Pigment Blue 15:4, C.I. Pigment Blue 15:34, C.I. Pigment Blue 16, C.I. Pigment Blue 22, C.I. Pigment Blue 60, C.I. Pigment Blue 63, C.I. Pigment Blue 66, C.I. Vat Blue 4, and C.I. Vat Blue 60.

Note that, an ink having excellent color tone and lightfastness, and a desirable balance can be obtained by using C.I. Pigment Yellow 74 as a yellow pigment, C.I. Pigment Red 122 and C.I. Pigment Violet 19 as magenta pigments, and C.I. Pigment Blue 15:3 as a cyan pigment.

Moreover, a coloring material newly produced for the present disclosure can be also used for the ink of the present disclosure.

In view of coloring of an obtainable image, moreover, a self-dispersible pigment may be used, and an anionic self-dispersible pigment is preferably used. The anionic self-dispersible pigment is a pigment whose dispersion state is stabilized by introducing anionic functional group directly or via another atomic group to a surface of the pigment.

As the pigment before a dispersion state of the pigment is stabilized, various pigments known in the art, such as the pigments listed in International Patent Publication No. WO2009/014242, can be used.

Note that, the anionic functional group is a functional group, from which a half or more hydrogen ions are detached at pH 7.0.

Examples of the anionic functional group include a carboxyl group, a sulfo group, and a phosphonic acid group. Among the above-listed examples, a carboxyl group or a phosphonic acid group is preferable because an optical density of an obtained image can be enhanced.

Examples of a method for introducing an anionic functional group into a surface of the pigment include a method for oxidizing carbon black.

Examples of the method for oxidizing include a method for processing with hypochlorite, ozonation water, hydrogen peroxide, chlorite, or nitric acid, and a surface treatment method using diazonium salt as disclosed in Japanese Patent (JP-B) No. 3808504, and JP-A Nos. 2009-515007 and 2009-506196.

Examples of commercial available pigments to which hydrophilic functional groups are introduced to surface of the pigments include: CW-1, CW-2, and CW-3 (all available from ORIENT CHEMICAL INDUSTRIES CO., LTD.); and CAB-O-JET200, CAB-O-JET300, and CAB-O-JET400 (all available from Cabot Corporation Corporation).

Examples of the dyes include dyes classified by Color Index as acid dyes, direct dyes, base dyes, reactive dyes, and food dyes.

Examples of the acid dyes and the food dyes include: C.I. Acid Black 1, 2, 7, 24, 26, 94; C.I Acid Yellow 17, 23, 42, 44, 79, 142; C.I. Acid Blue 9, 29, 45, 92, 249; C.I. Acid Red 1, 8, 13, 14, 18, 26, 27, 35, 37, 42, 52, 82, 87, 89, 92, 97, 106, 111, 114, 115, 134, 186, 249, 254, 289; C.I. Food Black 1, 2; C.I. Food Yellow 3, 4; and C.I. Food Red 7, 9, 14.

Examples of the direct dyes include: C.I. Direct Black 19, 22, 32, 38, 51, 56, 71, 74, 75, 77, 154, (168), 171; C.I. Direct Yellow 1, 12, 24, 26, 33, 44, 50, 86, 120, 132, 142, 144; C.I. Direct Blue 1, 2, 6, 15, 22, 25, 71, 76, 79, 86, 87, 90, 98, 163, 165, 199, 202; C.I. Direct Red 1, 4, 9, 13, 17, 20, 28, 31, 39, 80, 81, 83, 89, 225, 227; and C.I. Direct Orange 26, 29, 62, 102.

Examples of the base dyes include: C.I. Basic Black 2, 8; C.I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, 91; C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, 155; and C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, 112.

Examples of the reactive dyes include: C.I. Reactive Black 3, 4, 7, 11, 12, 17; C.I. Reactive Yellow 1, 5, 11, 13, 14, 20, 21, 22, 25, 40, 47, 51, 55, 65, 67; C.I. Reactive Blue 1, 2, 7, 14, 15, 23, 32, 35, 38, 41, 63, 80, 95; and C.I. Reactive Red 1, 14, 17, 25, 26, 32, 37, 44, 46, 55, 60, 66, 74, 79, 96, 97.

An amount of the coloring material is not particularly limited and may be appropriately selected depending on the intended purpose, but the amount of the coloring material is preferably 0.5% by mass or greater but 20% by mass or less, more preferably 1% by mass or greater but 10% by mass or less, relative to a total amount of the coloring material dispersion.

<Water>

The water is not particularly limited and may be appropriately selected depending on the intended purpose. Examples of the water include pure water and ultrapure water, such as ion-exchanged water, ultrafiltration water, Mill-Q water, and distilled water.

An amount of the water is not particularly limited and may be appropriately selected depending on the intended purpose, but the amount of the water is preferably 20% by mass or greater but 60% by mass or less, relative to a total amount of the coloring material dispersion.

(Ink)

The ink of the present disclosure include water, a coloring material, and the copolymer of the present disclosure, preferably further includes an organic solvent and a surfactant, and may further include other ingredients according to the necessity.

The ink of the present disclosure using the copolymer of the present disclosure can achieve a high image density, when the ink is printed on plain paper. Moreover, the ink has excellent storage stability, and does not cause beading (unevenness) at high-speed printing.

<Coloring Material>

As the coloring material, a coloring material identical to the coloring material for the coloring material dispersion can be used.

<Organic Solvent>

The ink of the present disclosure preferably includes an organic solvent in order to enhance permeability to plain paper or coated paper to prevent occurrences of beading, and in order to prevent drying of the ink utilizing a wetting effect.

The organic solvent is not particularly limited. Examples of the organic solvent include: polyvalent alcohols, such as ethylene glycol, diethylene glycol, triethylene glycol, tetraethylene glycol, polyethylene glycol, propylene glycol, dipropylene glycol, tripropylene glycol, polypropylene glycol, 1,3-butanediol, 3-methyl-1,3-butanediol, trimethylol ethane, trimethylol propane, 1,5-pentanediol, 1,6-hexanediol, hexylene glycol, glycerin, 1,2,3-butanetriol, 1,2,4-butanetriol, 1,2,6-hexanetriol, isopropylidene glycerol, and 3-methylpentane-1,3,5-triol; polyvalent alcohol alkyl ethers, such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyvalent alcohol aryl ethers, such as ethylene glycol monophenyl ether, and ethylene glycol monobenzyl ether; nitrogen-containing heterocyclic compounds, such as 2-pyrrolidone, N-methyl-2-pyrrolidone, N-hydroxyethyl-2-pyrrolidone, 1, 3-dimethylimidazolidinone, ε-caprolactam, and γ-butyrolactone; amides, such as formamide, N-methylformamide, N,N-dimethylformamide, 3-methoxy-N,N-dimethylpropionamide, and 3-butoxy-N,N-dimethylpropion; amines, such as monoethanol amine, diethanol amine, triethanol amine, monoethyl amine, diethyl amine, and triethyl amine; sulfur-containing compounds, such as dimethyl sulfoxide, sulfolane, and thiodiethanol; 3-ethyl-3-hydroxymethyloxetane; propylene carbonate; and ethylene carbonate. The above-listed examples may be used alone or in combination.

Among the above-listed examples, 3-ethyl-3-hydroxymethyloxetane, isopropylidene glycerol, N,N-dimethyl-β-methoxypropionamide, and N,N-dimethyl-β-butoxypropionamide are preferable in view of prevention of curling of plain paper.

Moreover, diethylene glycol, triethylene glycol, 1,3-butanediol, 2,2,4-trimethyl-1,3-pentanediol, and glycerin are excellent in view of prevention of ejection failures caused by evaporation of moisture.

As organic solvents, other than the above-listed examples, aliphatic diols, such as 2-ethyl-2-methyl-1,3-propanediol, 2,2-diethyl-1,3-propanediol, 2-methyl-2-propyl-1,3-propanediol, 3,3-dimethyl-1,2-butanediol, 2,4-dimethyl-2,4-pentanediol, 2,5-dimethyl-2,5-hexanediol, and 5-hexene-1,2-diol, can be used.

As organic solvents used in combination with the above-listed organic solvents, moreover, alkyl or aryl ethers of polyvalent alcohols, such as diethylene glycol monobutyl ether, propylene glycol monobutyl ether, ethylene glycol monophenyl ether, diethylene glycol monophenyl ether, ethylene glycol monoallyl ether, and tetraethylene glycol chlorophenyl ether, and lower alcohols, such as ethanol, can be appropriately selected for use.

A surfactant is preferably used for the ink of the present disclosure in order to enhance permeability and wettability of the ink to plain paper or coated paper, and preventing occurrences of beading.

<Surfactant>

Examples of the surfactant are silicone-based surfactants, fluorosurfactants, amphoteric surfactants, nonionic surfactants, anionic surfactants, etc.

The silicone-based surfactant has no specific limit and can be suitably selected to suit to a particular application. Of these, preferred are silicone-based surfactants which are not decomposed even in a high pH environment. Specific examples thereof include, but are not limited to, side-chain-modified polydimethylsiloxane, both end-modified polydimethylsiloxane, one-end-modified polydimethylsiloxane, and side-chain-both-end-modified polydimethylsiloxane. A silicone-based surfactant having, as a modified group, a polyoxyethylene group or a polyoxyethylene polyoxypropylene group is particularly preferable because such an agent demonstrates good characteristics as an aqueous surfactant. It is possible to use a polyether-modified silicone-based surfactant as the silicone-based surfactant. A specific example thereof is a compound in which a polyalkylene oxide structure is introduced into the side chain of the Si site of dimethyl siloxane.

Specific examples of the fluoro surfactants include, but are not limited to, perfluoroalkyl sulfonic acid compounds, perfluoroalkyl carboxylic acid compounds, perfluoroalkyl phosphoric acid ester compounds, adducts of perfluoroalkyl ethylene oxide, and polyoxyalkylene ether polymer compounds having a perfluoroalkyl ether group in its side chain. These are particularly preferable because they do not foam easily. Specific examples of the perfluoroalkyl sulfonic acid compounds include, but are not limited to, perfluoroalkyl sulfonic acid and salts of perfluoroalkyl sulfonic acid. Specific examples of the perfluoroalkyl carboxylic acid compounds include, but are not limited to, perfluoroalkyl carboxylic acid and salts of perfluoroalkyl carboxylic acid. Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain and salts of polyoxyalkylene ether polymers having a perfluoroalkyl ether group in its side chain. Counter ions of salts in these fluorine-based surfactants are, for example, Li, Na, K, NH$_4$, NH$_3$CH$_2$CH$_2$OH, NH$_2$(CH$_2$CH$_2$OH)$_2$, and NH(CH$_2$CH$_2$OH)$_3$.

Specific examples of the amphoteric surfactants include, but are not limited to, lauryl aminopropionic acid salts, lauryl dimethyl betaine, steallyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides, etc.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactants has no particular limit. Specific examples thereof include, but are not limited to, side-chain-modified polydimethyl siloxane, both end-modified polydimethylsiloxane, one-end-modified polydimethylsiloxane, and side-chain-both-end-modified polydimethylsiloxane. In particular, a polyether-modified silicone-based surfactant having a polyoxyethylene group or a polyoxyethylene polyoxypropylene group is particularly preferable because such a surfactant demonstrates good characteristics as an aqueous surfactant.

Any suitably synthesized surfactant and any product thereof available on the market is suitable. Products available on the market are obtained from Byc Chemie Japan Co., Ltd., Shin-Etsu Silicone Co., Ltd., Dow Corning Toray Co., Ltd., etc., NIHON EMULSION Co., Ltd., Kyoeisha Chemical Co., Ltd., etc.

The polyether-modified silicon-containing surfactant has no particular limit. For example, a compound in which the polyalkylene oxide structure represented by the following Chemical structure S-1 is introduced into the side chain of the Si site of dimethyl polysiloxane.

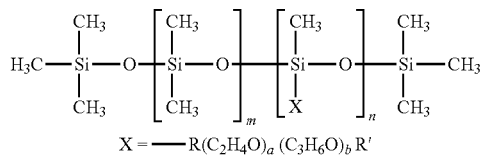

Chemical Structure S-1

In Chemical Structure S-1, "m", "n", "a", and "b" each, respectively represent integers, R represents an alkylene group, and R' represents an alkyl group.

Specific examples of polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Japan KK.), and TSF4440, TSF4452, and TSF4453 (all manufactured by Momentive Performance Materials Inc.).

The number of carbon atoms replaced with fluorine atoms in the fluorosurfactant is preferably 2 or greater but 16 or less, more preferably 4 or greater but 16 or less.

Examples of the fluorosurfactants include, but are not limited to, perfluoroalkyl phosphoric acid ester compounds, adducts of perfluoroalkyl ethylene oxide, and polyoxyalkylene ether polymer compounds each having a perfluoroalkyl ether group in its side chain.

Of these, polyoxyalkylene ether polymer compounds each having a perfluoroalkyl ether group in its side chain are preferable because they do not foam easily and the fluorosurfactant represented by Chemical Formula F-1 or Chemical Formula F2 is more preferable.

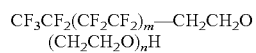

Chemical Formula F-1

In the compound represented by Chemical Formula F-1, m is preferably an integer of 0 or greater bur 10 or less and n is preferably an integer of 0 or greater but 40 or less for the purpose of imparting water solubility.

Chemical Formula (F-2)

In the compound represented by Chemical Formula F-2, Y is H, or $C_nF_{2n+1}$ where n is an integer of 1 or greater but 6 or less, or CH$_2$CH(OH)CH$_2$—$C_nF_{2n+1}$ where n is an integer of 4 or greater but 6 or less, or $C_pH_{2p+1}$ where p is an integer of 1 or greater but 19 or less, and a is an integer of 4 or greater but 14 or less.

Products available on the market may be used as the fluorosurfactant.

Specific examples of the products available on the market include, but are not limited to, SURFLON S-111, S-112, S-113, S-121, S-131, S-132, S-141, and S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL TBS, FSP, FSA, FSN-100, FSN, FSO-100, FSO, FS-300, and UR (all manufactured by DuPont); FT-110, FT-250, FT-251, FT-400S, FT-150, and FT-400SW (all manufactured by NEOS COMPANY LIMITED), POLYFOX PF-136A, PF-156A, PF-151N, PF-154, and PF-159 (all manufactured by OMNOVA SOLUTIONS INC.), and UNIDYNE DSN-403N (manufactured by DAIKIN INDUSTRIES). Of these, FS-300 (manufactured by DuPont), FT-110, FT-250, FT-251, FT-400S, FT-150, and FT-400SW (all manufactured by NEOS COMPANY LIMITED), POLYFOX PF-151N (manufactured by OMNOVA SOLUTIONS INC.), and UNIDYNE DSN-403N (manufactured by DAIKIN INDUSTRIES) are preferable in terms of good printing quality, coloring in particular, and improvements on permeation, wettability, and uniform dying property to paper.

The proportion of the surfactant in ink is not particularly limited. It is preferably from 0.001 to 5 percent by mass and more preferably from 0.05 to 5 percent by mass ink in terms of excellent wettability and discharging stability and improvement on image quality.

<Water>

As the water, water identical to the water used for the coloring material dispersion can be used.

<Other Ingredients>

Examples of the above-described other ingredients include a defoaming agent, preservatives and fungicides, a corrosion inhibitor, a pH regulator, an antioxidant, a UV absorber, an oxygen absorber, and a light stabilizer.

<Defoaming Agent>

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable to easily break foams.

<Preservatives and Fungicides>

The preservatives and fungicides are not particularly limited. A specific example is 1,2-benzisothiazoline-3-on.

<Corrosion Inhibitor>

The corrosion inhibitor has not particular limit. Examples thereof are acid sulfite and sodium thiosulfate.

<pH Regulator>

The pH regulator has no particular limit. It is preferable to adjust the pH to 7 or higher. Specific examples thereof include, but are not limited to, amines such as diethanol amine and triethanol amine.

<Antioxidant>

Examples of the antioxidant include phenol-based antioxidants (including hindered phenol-based antioxidants), amine-based antioxidants, sulfur-based antioxidants, and phosphorus-based antioxidants.

<UV Absorber>

Examples of the UV absorber include benzophenone-based UV absorbers, benzotriazole-based UV absorbers, salicylate-based UV absorbers, cyanoacrylate-based UV absorbers, and nickel complex salt-based UV absorbers.

[Production Method of Ink]

For example, the ink of the present disclosure can be produced by dispersing or dissolving the water, the organic solvent, the coloring material, the copolymer and optionally the above-mentioned other ingredients in an aqueous medium, and stirring and mixing the mixture. Moreover, the copolymer may be used as a coloring material dispersing resin used when a coloring material dispersion is produced.

For example, the dispersing can be performed by a sand mill, a homogenizer, a ball mill, a paint shaker, and an ultrasonic disperser. The stirring and mixing can be performed by a stirrer using typical stirring blades, a magnetic stirrer, and a high-speed disperser.

It is preferred during the production that coarse particles be removed from the ink by a filter or a centrifugal separator and the ink be deaerated.

The property of the ink is not particularly limited. For example, viscosity, surface tension, pH, etc., are preferably in the following ranges.

The viscosity of the ink at 25 degrees C. is preferably from 5 to 30 mPa·s and more preferably from 5 to 25 mPa·s to improve print density and text quality and obtain good dischargeability. The viscosity can be measured by, for example, a rotatory viscometer (RE-80L, manufactured by TOKI SANGYO CO., LTD.). The measuring conditions are as follows:

Standard cone rotor (1° 34'×R24)
Sample liquid amount: 1.2 mL
Number of rotations: 50 rotations per minute (rpm)
25 degrees C.
Measuring time: three minutes The surface tension of the ink is preferably 35 mN/m or less and more preferably 32 mN/m or less at 25 degrees C. in terms that the ink is suitably levelized on a print medium and the drying time of the ink is shortened.

The pH of the ink is preferably from 7 to 12 and more preferably from 8 to 11 in terms of prevention of corrosion of metal materials contacting the ink.

<Print Medium>

The print medium for use in printing is not particularly limited. Specific examples thereof include, but are not limited to, plain paper, gloss paper, special paper, cloth, film, transparent sheets, printing paper for general purpose.

(Ink Stored Container)

The ink stored container of the present disclosure include the ink and a container storing the ink, and may further include appropriately selected other members according to the necessity.

The container is not particularly limited and may be of any shape, any structure, any size, any material, etc. that may be appropriately selected depending on the intended purpose. Preferable examples of the container include a container including at least, for example, an ink bag formed of, for example, an aluminum laminate film or resin film.

The ink stored container is described with reference to FIGS. 1 and 2.

Figure 2:
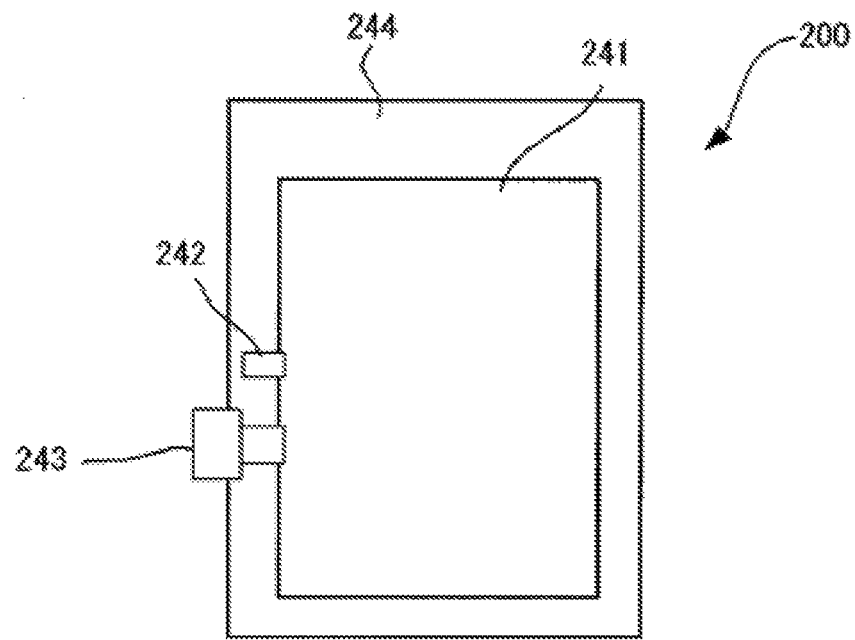
FIG. 2 is a schematic view including a case of the ink stored container of FIG. 1.

FIG. 1 is a view illustrating one example of the ink stored container, and FIG. 2 is a view including a case (exterior) of the ink stored container of FIG. 1. Within the ink stored container 200, the ink is introduced into the ink bag 241 through the ink inlet 242, and the air is removed, followed by closing the ink inlet 242 through fusing.

At the time of use, the ink is supplied to a device by inserting a needle of a device main body into the ink outlet 243 formed of a rubber member. The ink bag 241 is formed of a non-permeable wrapping member, such as an aluminium laminate film. As illustrated in FIG. 2, the ink bag 241 is typically accommodated in the cartridge case 244 formed of plastic, which is detachably mounted in various devices for ejecting liquids.

(Method for Ejecting Liquid and Device for Ejecting Liquid)

The method for ejecting a liquid includes a liquid discharging step, and may further include a heating step and other steps according to the necessity.

The device for ejecting a liquid of the present disclosure includes a liquid discharging unit, and may further include a heating unit and other units according to the necessity.

The method for ejecting a liquid of the present disclosure can be suitably performed by the device for ejecting a liquid of the present disclosure, and the liquid discharging step can be suitably performed by the liquid discharging unit. Moreover, the heating step can be suitably performed by the heating unit, and the other steps can be suitably performed by the other units.

—Liquid Discharging Step and Liquid Discharging Unit—

The liquid discharging step is a step including applying stimuli (energy) to the ink of the present disclosure to discharge the ink from various nozzles for ejecting inks to print an image on a print medium.

The liquid discharging unit is a unit configured to apply stimuli (energy) to the ink of the present disclosure to discharge the ink from various nozzles for ejecting inks onto a print medium.

The stimuli is not particularly limited and may be appropriately selected depending on the intended purpose. Examples of the stimuli include heat (temperature), pressure, vibration, and light. The above-listed examples may be used alone or in combination. Among the above-listed examples, heat and pressure are preferable.

Examples of an embodiment of the discharging of the ink include: a so-called piezo system (see, e.g., Japanese Examined Patent Publication No. 02-51734) where a vibration plate forming a wall surface of an ink flow path is deformed using a piezoelectric element serving as a pressure generating unit configured to press the ink inside the ink flow path to change an inner capacity of the ink flow path, to thereby eject ink droplets; a thermal system (see, e.g., Japanese Examined Patent Publication No. 61-59911) where the ink is heated within a ink flow path using a heat element to generate bubbles; an electrostatic system (see, e.g., Japanese Unexamined Patent Application Publication No. 06-71882) where a vibration plate forming a wall surface of an ink flow path and an electrode are arranged to face each other, the vibration plate is deformed with an electrostatic force generated between the vibration plate and the electrode to change an inner capacity of the ink flow path to thereby eject ink droplets.

For example, the size of droplets of the ink discharged is preferably 3 pL or greater but 40 pL or less, the speed of the discharging is preferably 5 m/s or greater but 20 m/s or less, the driving frequency is preferably 1 kHz or higher, and the resolution is preferably 300 dpi or higher.

—Heating Step and Heating Unit—

The heating step is a step including heating the print medium, on which the image is printed.

The heating unit is a unit configured to heat the print medium, on which the image is printed.

A high quality image can be printed on the nonpermeable print medium by the method for ejecting a liquid and the device for ejecting a liquid. However, the nonpermeable print medium is preferably heated after the printing in order to form an image of higher image quality, abrasion resistance, and adhesion, and correspond to high-speed printing conditions. When the heating step is provided after the printing, a film formation of the resin contained in the ink is accelerated to thereby improve the image hardness of the printed matter.

Various devices known in the art can be used as the device used for the heating step. Examples of the device include devices for forced-air heating, radiation heating, conduction heating, high-frequency drying, and microwave drying. The above-listed examples may be used alone or in combination.

The heating temperature can be changed depending on a type or amount of an organic solvent included in the ink and a minimum film forming temperature of a resin emulsion added to the ink. Moreover, the heating temperature can be changed depending on a type of print media to be printed.

The heating temperature is preferably high in view of drying and a film forming temperature. The heating temperature is preferably 40° C. or higher but 120° C. or lower, more preferably 40° C. or higher but 100° C. or lower, and particularly preferably 50° C. or higher but 90° C. or lower.

Figure 3:
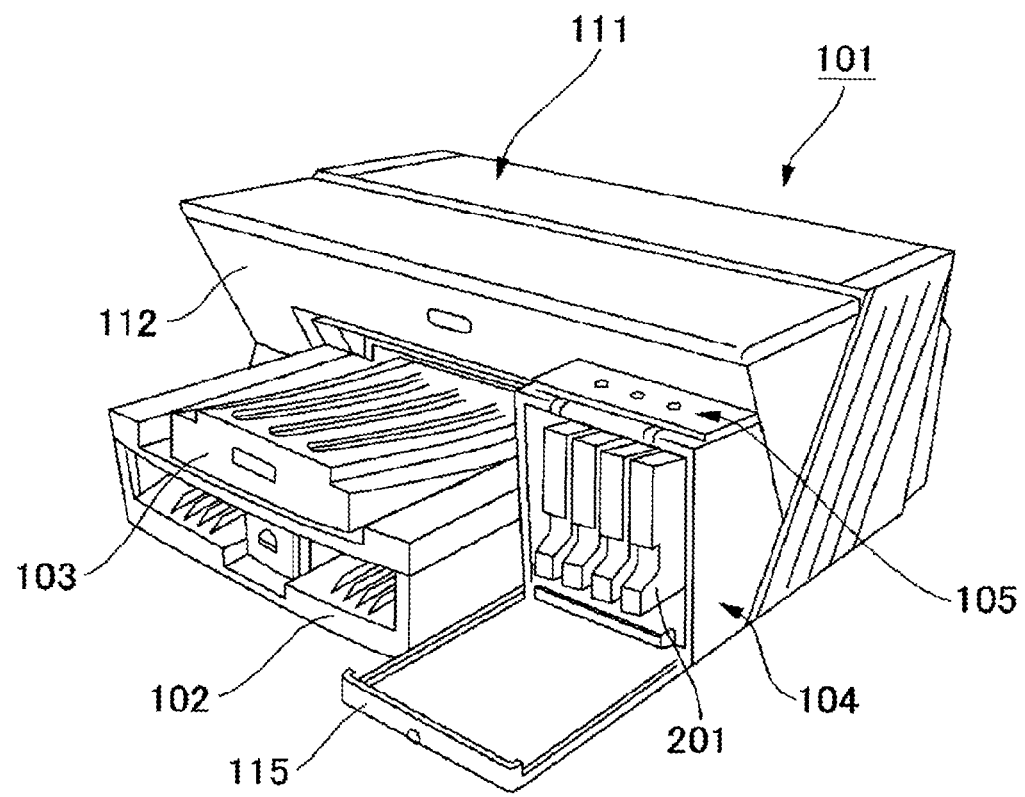
FIG. 3 is a schematic view illustrating one example of a device for ejecting a liquid.
Figure 4:
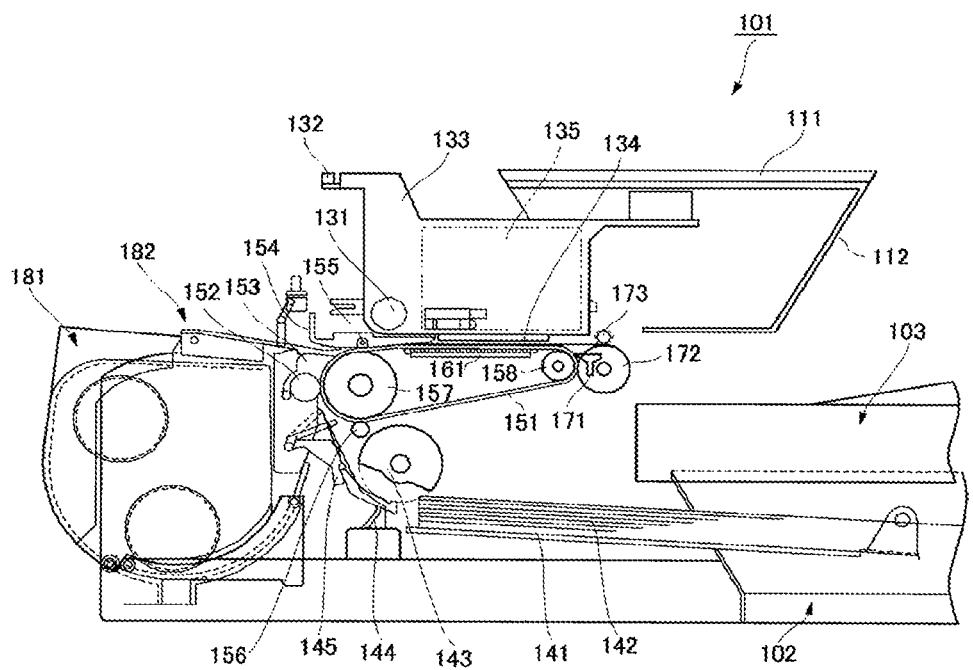
FIG. 4 is a schematic view illustrating one example of a structure within a main body of the device of FIG. 3.

The device for ejecting a liquid, which can perform printing using the ink, is described with reference to drawings. As the device for ejecting a liquid, a serial type (shuttle type) device where a carriage scans, and a line-type device equipped with a line-type head. FIG. 3 is a schematic view illustrating one example of a serial type device for ejecting a liquid according an embodiment of the present disclosure. FIG. 4 is a schematic view illustrating a structure within a main body of the device of FIG. 3.

As illustrated in FIG. 3, the device for ejecting liquid includes a device main body 101, a paper feeding tray 102 mounted in the device main body 101, a paper ejection tray 103, and an ink stored container loading unit 104. An operation unit 105, such as control keys and a display, is arranged on a top surface of the ink stored container loading unit 104. The ink stored container loading unit 104 has a front cover 115 that can be open and closed in order to replace the ink stored container 201. The reference numeral 111 is a top cover, and the reference numeral 112 is a front surface of the front cover.

As illustrated in FIG. 4, within the device main body 101, a carriage 133 is slidably held in a main scanning direction with a guide rod 131 that is a guide member laterally bridged to right and left side boards (not illustrated) and a stay 132, and the carriage 133 is run and scanned by a main scanning motor (not illustrated).

In the carriage 133, a liquid ejection head 134, which is composed of 4 inkjet liquid ejection heads for ejecting ink droplets of yellow (Y), cyan (C), magenta (M), and black (Bk), is mounted in a manner that a plurality of inkjet ejection openings of the liquid ejection head 134 are arranged in a direction crossing the main scanning direction, and the direction for ejecting the ink droplets is arranged downwards.

As the inkjet liquid ejection heads constituting the liquid ejection head 134, usable are heads each equipped with an energy generating unit for ejecting an ink, such as a piezoelectric actuator (e.g., a piezoelectric element), a thermal actuator utilizing a phase change caused by film boiling of a liquid using an electrothermal energy conversion element (e.g., a heat resistor), a shape-memory alloy actuator utilizing a metal phase change due to a temperature change, and an electrostatic actuator utilizing an electrostatic force.

Moreover, a subtank 135 of each color configured to supply an ink of each color to the liquid ejection head 134 is mounted in the carriage 133. The subtank 135 is refilled by supplying the ink from the ink stored container 201 of the present disclosure mounted in the ink stored container loading unit 104, through an ink supply tube (not illustrated).

As a paper feeding unit configured to feed a print medium 142 loaded on a print medium loading unit (pressure plate) 141 of a paper feeding tray 102, a semicircular roller (paper feeding roller 143) configured to separate the print media 142 one by one from the print medium loading unit 141 and feed the print medium 142, and a separation pad 144 facing the paper feeding roller 143 and formed of a material having a large friction coefficient are equipped. The separation pad 144 is pressed against the paper feeding roller 143.

As a conveying unit configured to convey the print medium 142 fed from the paper feeding unit below the liquid ejection head 134, a conveying belt 151 configured to adhere the print medium 142 with an electrostatic force and to convey the print medium 142, a counter roller 152 configured to nip the print medium 142, which is sent from the paper feeding unit through a guide 145, between the counter roller 152 and the conveying belt 151 to convey the print medium 142, a conveying guide 153 configured to change the direction of the print medium 142 sent substantially vertically upwards by about 90° to allow the print medium 142 move along the conveying belt 151, and an edge press roller 155 pressed against the conveying belt 151 by a pressing member are equipped. Moreover, a charging roller 156, which is a charging unit configured to charge a surface of the conveying belt 151, is equipped.

The conveying belt 151 is an endless belt, and passed between a heater conveying roller 157 and a tension roller 158, and is rotatable in the belt conveying direction. The conveying belt 151 includes a surface layer, which is a print medium adhering surface formed of, for example, a resin material having a thickness of about 40 μm whose resistance has not been controlled (e.g., tetrafluoroethylene-ethylene copolymer (ETFE)), and a back layer (medium resistance layer, earth layer) formed of the same material to the material of the surface layer, and subjected to resistance control with carbon. At the back side of the conveying belt 151, a heater guide member 161 is arranged to correspond to a printing region of the liquid ejection head 134. As a paper ejection unit configured to eject the print medium 142, which has been printed by the liquid ejection head 134, a separation claw 171 configured to separate the print medium 142 from the conveying belt 151, a paper ejection roller, and a paper ejection roller 173 are equipped. After convection drying the print medium 142 by a fan heater (not illustrated), the print medium 142 is output to a paper ejection tray 103 disposed at the bottom of the paper ejection roller 172.

At the rear of the device main body 101, a double-sided paper feeding unit 181 is detachably mounted. The double-sided paper feeding unit 181 is configured to takes in the print medium 142, which has been returned with a rotation in the reverse direction of the conveying belt 151, and to flip the print medium 142 and again feed between the counter roller 152 and the conveying belt 151. Note that, a manual paper feeding unit 182 is disposed on the top surface of the double-sided paper feeding unit 181.

Within the device for ejecting a liquid, the print media 142 is separated and fed one by one from the paper feeding unit, the print medium 142 fed substantially vertically upwards is guided by the guide 145, and the print medium 142 is conveyed in the state that the print medium 142 is nipped between the conveying belt 151 and the counter roller 152. Moreover, the edge of the print medium 142 is guided by the conveying guide 153, and is pressed against the conveying belt 151 with the edge press roller 155 to change the conveying direction by about 90°. During the process as mentioned, the conveying belt 151 is charged by the charging roller 156, and the print medium 142 is conveyed by electrostatically adhering the print medium 142 on the conveying belt 151.

Then, ink droplets are ejected on the stopped print medium 142 to print for 1 line by driving the liquid ejection head 134 according to the image signal with moving the carriage 133, and then the print medium 142 is conveyed by a predetermined distance followed by printing for a next line. When a print terminating signal or a signal indicating that a rear edge of the print medium 142 reaches the printing region is received, a printing operation is finished, and the print medium 142 is ejected to the paper ejection tray 103.
(Printed Matter)

The printed matter include an image printed with the ink on a print medium.

The print medium is not particularly limited and may be appropriately selected depending on the intended purpose. Examples of the print medium include plain paper, gloss paper, special paper, cloth, a nonpermeable print medium.

EXAMPLES

The present disclosure will be described below more specifically by way of Examples. The present disclosure should not be construed as being limited to the Examples.

Number average molecular weights and weight average molecular weights of the copolymers of Examples and Comparative Examples were measured in the following manner.
[Measurements of Number Average Molecular Weight and Weight Average Molecular Weight of Copolymer]

The number average molecular weight and weight average molecular weight of each copolymer were measured by gel permeation chromatography (GPC) under the following conditions.
Device: GPC-8320GPC (available from Tosoh Corporation)
Column: TSK G2000HXL and G4000HXL (both available from Tosoh Corporation)
Temperature: 40° C.
Solvent: tetrahydrofuran (THF)
Flow rate: 0.6 mL/min The copolymer having a concentration of 0.5% by mass in an amount of 1 mL was injected to measure under the conditions above to obtain a molecular weight distribution of the copolymer. The number average molecular weight Mn and weight average molecular weight Mw of the copolymer were calculated from the molecular weight distribution using a molecular weight calibration curve prepared from monodisperse polystyrene standard samples.

Example 1

Synthesis of Copolymer CP

In 200 mL of methylene chloride, 62.0 g (525 mmol) of 1,6-hexanediol (available from Tokyo Chemical Industry Co., Ltd.) was dissolved. To the resultant solution, 20.7 g (262 mmol) of pyridine was added. To the solution, a solution prepared by dissolving 50.0 g (262 mmol) of 2-naphthalene carbonyl chloride (available from Tokyo Chemical Industry Co., Ltd.) in 100 mL of methylene chloride was dripped for 30 minutes with stirring, followed by stirring the mixture for 6 hours at room temperature (25° C.). After washing the obtained reaction solution with water, an organic phase was separated and dried with magnesium sulfate, and the solvent was removed. The residue was purified by silica gel column chromatography using a methylene chloride/methanol (volume ratio: 98/2) mixed solvent as an eluent, to thereby obtain 52.5 g of 6-hydroxyhexyl-2-naphthoate.

Subsequently, 40.9 g (150 mmol) of 6-hydroxyhexyl-2-napthoate was dissolved in 100 mL of dehydrated methylene chloride, and the resultant solution was heated to 40° C.

To the solution, a solution prepared by dissolving 0.029 g (0.045 mmol) of dibutyltin dilaurate in 29.9 g (150 mmol) of 2-(2-isocyanate ethoxy)ethylmethacrylate (KARENZ MOI-EG, available from SHOWA DENKO K.K.) was dripped over 1 hour with stirring, followed by stirring for 12 hours at 40° C. After cooling the resultant to room temperature (25° C.), the solvent was removed from the mixture. The residue was purified by silica gel column chromatography using a methylene chloride/methanol (volume ratio: 99/1) mixed solvent as an eluent, to thereby obtain 48.7 g of Monomer M-1 represented by Structural Formula (4-1) below.

Structural Formula (4-1)

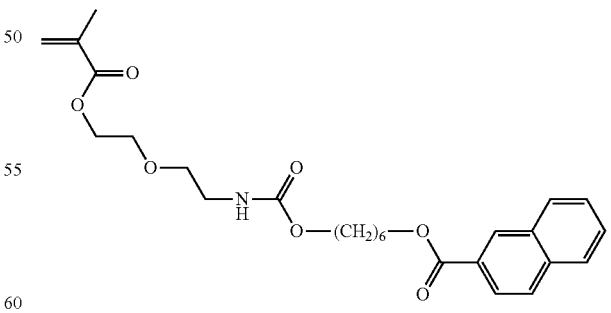

Figure 5:
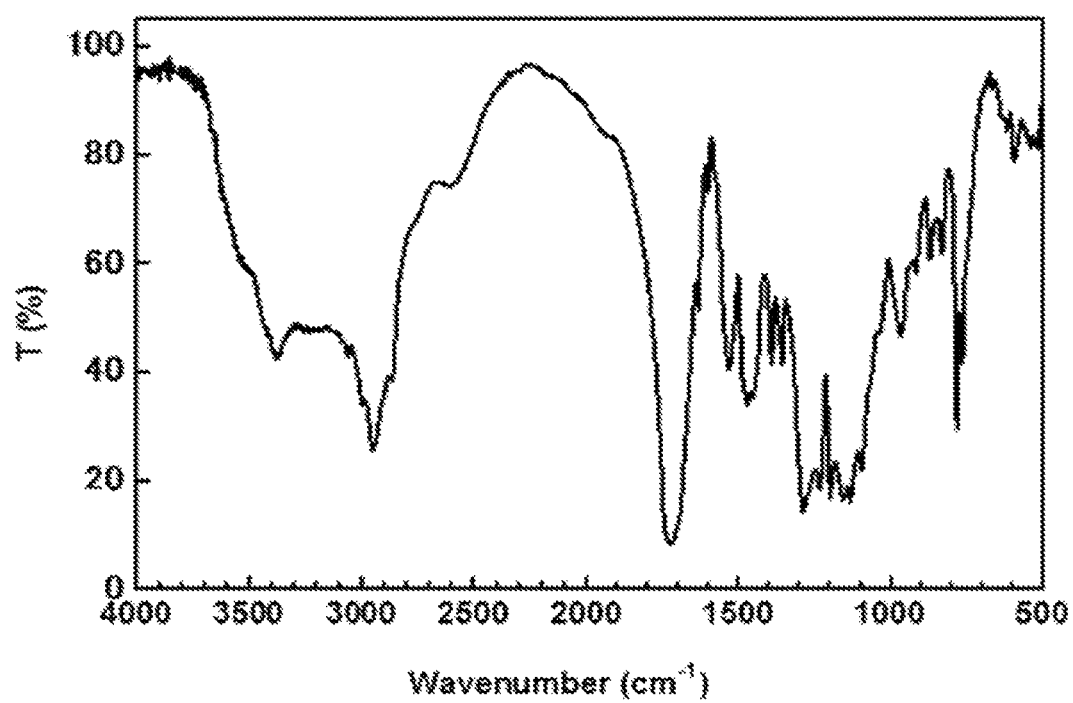
FIG. 5 is a chart depicting an IR spectrum of Copolymer CP-1 obtained in Example 1.

Subsequently, 1.50 g (20.8 mmol) of acrylic acid (available from Tokyo Chemical Industry Co., Ltd.) and 7.01 g (14.9 mmol) of Monomer M-1 were dissolved in 40 mL of methyl ethyl ketone to prepare a monomer solution. After heating 10% by mass of the prepared monomer solution to 75° C. under a flow of argon gas, a solution prepared by dissolving 0.085 g (0.52 mmol) of 2,2'-azoiso(butyronitrile) (available from Tokyo Chemical Industry Co., Ltd.) and 0.018 g (0.17 mmol) of 3-mercaptopropionic acid in the rest of the monomer solution was dripped over 2 hours, followed by stirring for 4 hours at 75° C. After cooling the resultant to room temperature (25° C.), the obtained resultant reaction solution was added to hexane. The precipitate was collected through filtration, followed by drying under reduced pressure, to thereby obtain 8.33 g of Copolymer CP-1 (number average molecular weight (Mn): 10,200, weight average molecular weight (Mw): 20,500). The IR spectrum of the obtained copolymer is presented in FIG. 5.

Subsequently, 2.00 g of the obtained copolymer was dissolved in a tetraethyl ammonium hydroxide aqueous solution in a manner that a concentration of the copolymer was to be 2.38% by mass and pH was to be 8.0, to thereby prepare an aqueous solution of Copolymer CP-1 for dispersing a pigment.

Example 2

Synthesis of Copolymer CP-2

In 200 mL of methylene chloride, 48.8 g (787 mmol) of ethylene glycol (available from Tokyo Chemical Industry Co., Ltd.) was dissolved. To the resultant solution, 21.8 g (275 mmol) of pyridine was added. To the solution, a solution prepared by dissolving 50.0 g (262 mmol) of 2-naphthalene carbonyl chloride (available from Tokyo Chemical Industry Co., Ltd.) in 100 mL of methylene chloride was dripped for 30 minutes with stirring, followed by stirring the mixture for 6 hours at room temperature. After washing the obtained reaction solution with water, an organic phase was separated and dried with magnesium sulfate, and the solvent was removed. The residue was purified by silica gel column chromatography using a methylene chloride/methanol (volume ratio: 99/1) mixed solvent as an eluent, to thereby obtain 72.6 g of 2-hydroxyethyl-2-naphthoate.

Subsequently, 32.5 g (150 mmol) of 2-hydroxyethyl-2-naphthoate was dissolved in 60 mL of dehydrated methylene chloride, and the resultant solution was heated to 40° C.

To the solution, a solution prepared by dissolving 0.029 g (0.045 mmol) of dibutyltin dilaurate in 29.9 g (150 mmol) of 2-(2-isocyanateethoxy)ethylmethacrylate (KARENZ MOI-EG, available from SHOWA DENKO K.K.) was dripped over 1 hour with stirring, followed by stirring for 12 hours at 40° C. After cooling the resultant to room temperature (25° C.), the solvent was removed from the mixture. The residue was purified by silica gel column chromatography using a methylene chloride/methanol (volume ratio: 99/1) mixed solvent as an eluent, to thereby obtain 39.4 g of Monomer M-2 represented by Structural Formula (4-2) below.

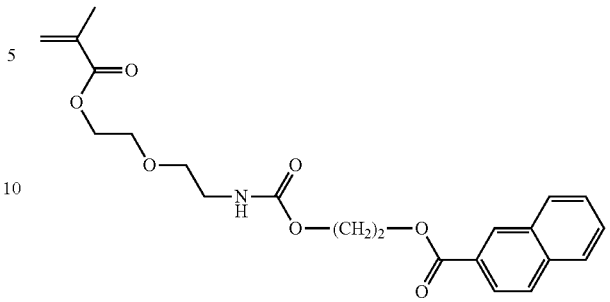

Structural Formula (4-2)

Subsequently, 1.58 g (21.9 mmol) of acrylic acid (available from Tokyo Chemical Industry Co., Ltd.) and 6.51 g (15.7 mmol) of Monomer M-2 were dissolved in 40 mL of methyl ethyl ketone to prepare a monomer solution. After heating 10% by mass of the prepared monomer solution to 75° C. under a flow of argon gas, a solution prepared by dissolving 0.090 g (0.55 mmol) of 2,2'-azoiso(butyronitrile) (available from Tokyo Chemical Industry Co., Ltd.) and 0.019 g (0.18 mmol) of 3-mercaptopropionic acid in the rest of the monomer solution was dripped over 2 hours, followed by stirring for 4 hours at 75° C. After cooling the resultant to room temperature (25° C.), the obtained resultant reaction solution was added to hexane. The precipitate was collected through filtration, followed by drying under reduced pressure, to thereby obtain 7.97 g of Copolymer CP-2 (number average molecular weight (Mn): 9,400, weight average molecular weight (Mw): 19,200).

Subsequently, 2.00 g of obtained Copolymer CP-2 was dissolved in a tetraethyl ammonium hydroxide aqueous solution in a manner that a concentration of Copolymer CP-2 was to be 2.38% by mass and pH was to be 8.0, to thereby prepare an aqueous solution of Copolymer CP-2 for dispersing a pigment.

Example 3

Synthesis of Copolymer CP-3

In 300 mL of tetrahydrofuran, 103 g (511 mmol) of 1,12-dodecanediol (available from Tokyo Chemical Industry Co., Ltd.) was dissolved. To the resultant solution, 14.2 g (179 mmol) of pyridine was added. To the solution, a solution prepared by dissolving 32.5 g (170 mmol) of 2-naphthalene carbonyl chloride (available from Tokyo Chemical Industry Co., Ltd.) in 100 mL of tetrahydrofuran was dripped for 30 minutes with stirring, followed by stirring the mixture for 6 hours at room temperature (25° C.). The obtained reaction solution was concentrated. To the obtained white residue, methanol was added. The mixture was stirred for 30 minutes followed by filtration. The obtained white solid was washed with water, and then with methanol in this order. Thereafter, the white solid was dried under reduced pressure. The resultant was purified by silica gel column chromatography using a methylene chloride/methanol (volume ratio: 98/2) mixed solvent as an eluent, to thereby obtain 41.5 g of 12-hydroxydodecyl-2-naphthoate.

Subsequently, 39.0 g (109 mmol) of 12-hydroxydodecyl-2-naphotoate was dissolved in 200 mL of dehydrated methylene chloride, and the resultant solution was heated to 40° C.

To the solution, a solution prepared by dissolving 0.021 g (0.033 mmol) of dibutyltin dilaurate in 21.8 g (109 mmol) of 2-(2-isocyanateethoxy)ethylmethacrylate (KARENZ MOI-EG, available from SHOWA DENKO K.K.) was dripped over 1 hour with stirring, followed by stirring for 12 hours at 40° C. After cooling the resultant to room temperature (25° C.), the solvent was removed from the mixture. The residue was purified by silica gel column chromatography using a methylene chloride/methanol (volume ratio: 99/1) mixed solvent as an eluent, to thereby obtain 38.8 g of Monomer M-3 represented by Structural Formula (4-3) below.

Structural Formula (4-3)

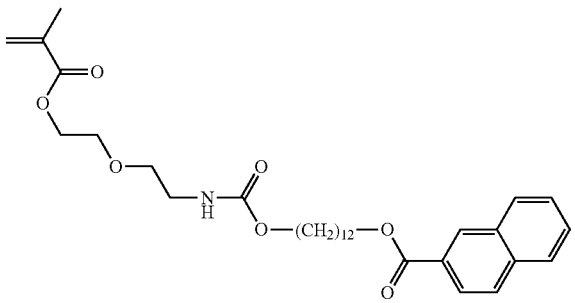

Subsequently, 1.24 g (17.2 mmol) of acrylic acid (available from Tokyo Chemical Industry Co., Ltd.) and 6.83 g (12.3 mmol) of Monomer M-3 were dissolved in 40 mL of methyl ethyl ketone to prepare a monomer solution. After heating 10% by mass of the prepared monomer solution to 75° C. under a flow of argon gas, a solution prepared by dissolving 0.071 g (0.43 mmol) of 2,2'-azoiso(butyronitrile) (available from Tokyo Chemical Industry Co., Ltd.) and 0.015 g (0.14 mmol) of 3-mercaptopropionic acid in the rest of the monomer solution was dripped over 2 hours, followed by stirring for 4 hours at 75° C. After cooling the resultant to room temperature (25° C.), the obtained resultant reaction solution was added to hexane. The precipitate was collected through filtration, followed by drying under reduced pressure, to thereby obtain 7.97 g of Copolymer CP-3 (number average molecular weight (Mn): 10,900, weight average molecular weight (Mw): 22,100).

Subsequently, 2.00 g of obtained Copolymer CP-3 was dissolved in a tetraethyl ammonium hydroxide aqueous solution in a manner that a concentration of the copolymer was to be 2.38% by mass and pH was to be 8.0, to thereby prepare an aqueous solution of Copolymer CP-3 for dispersing a pigment.

Example 4

Synthesis of Copolymer CP-4

In 200 mL of tetrahydrofuran, 75.9 g (294 mmol) of 1,16-hexadecanediol (available from Tokyo Chemical Industry Co., Ltd.) was dissolved. To the resultant solution, 12.2 g (154 mmol) of pyridine was added. To the solution, a solution prepared by dissolving 28.0 g (147 mmol) of 2-naphthalene carbonyl chloride (available from Tokyo Chemical Industry Co., Ltd.) in 100 mL of tetrahydrofuran was dripped for 30 minutes with stirring, followed by stirring the mixture for 6 hours at room temperature (25° C.). The obtained reaction solution was concentrated. To the obtained white residue, methanol was added. The mixture was stirred for 30 minutes followed by filtration. The obtained white solid was washed with water, and then with methanol in this order. Thereafter, the white solid was dried under reduced pressure. The resultant was purified by silica gel column chromatography using a methylene chloride/methanol (volume ratio: 98/2) mixed solvent as an eluent, to thereby obtain 43.3 g of 16-hydroxyhexadecane-2-naphthoate.

Subsequently, 41.4 g (100 mmol) of 16-hydroxyhexadecane-2-naphthoate was dissolved in 200 mL of dehydrated methylene chloride, and the resultant solution was heated to 40° C.

To the solution, a solution prepared by dissolving 0.019 g (0.030 mmol) of dibutyltin dilaurate in 20.0 g (100 mmol) of 2-(2-isocyanateethoxy)ethylmethacrylate (KARENZ MOI-EG, available from SHOWA DENKO K.K.) was dripped over 1 hour with stirring, followed by stirring for 12 hours at 40° C. After cooling the resultant to room temperature (25° C.), the solvent was removed from the mixture. The residue was purified by silica gel column chromatography using a methylene chloride/methanol (volume ratio: 98/2) mixed solvent as an eluent, to thereby obtain 43.3 g of Monomer M-4 represented by Structural Formula (4-4) below.

Structural Formula (4-4)

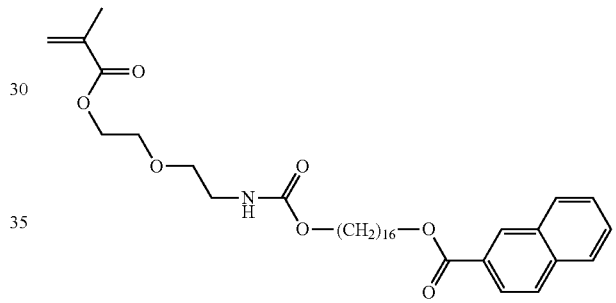

Subsequently, 1.14 g (15.8 mmol) of acrylic acid (available from Tokyo Chemical Industry Co., Ltd.) and 6.91 g (11.3 mmol) of Monomer M-4 were dissolved in 40 mL of methyl ethyl ketone to prepare a monomer solution. After heating 10% by mass of the prepared monomer solution to 75° C. under a flow of argon gas, a solution prepared by dissolving 0.065 g (0.40 mmol) of 2,2'-azoiso(butyronitrile) (available from Tokyo Chemical Industry Co., Ltd.) and 0.013 g (0.13 mmol) of 3-mercaptopropionic acid in the rest of the monomer solution was dripped over 2 hours, followed by stirring for 4 hours at 75° C. After cooling the resultant to room temperature (25° C.), the obtained resultant reaction solution was added to hexane. The precipitate was collected through filtration, followed by drying under reduced pressure, to thereby obtain 7.97 g of Copolymer CP-4 (number average molecular weight (Mn): 10,700, weight average molecular weight (Mw): 22,600).

Subsequently, 2.00 g of obtained Copolymer CP-4 was dissolved in a tetraethyl ammonium hydroxide aqueous solution in a manner that a concentration of Copolymer CP-4 was to be 2.38% by mass and pH was to be 8.0, to thereby prepare an aqueous solution of Copolymer CP-4 for dispersing a pigment.

Example 5

Synthesis of Copolymer CP-5

In 40 mL of methyl ethyl ketone, 64 g (19.0 mmol) of methacrylic acid (available from Tokyo Chemical Industry Co., Ltd.) and 6.42 g (13.6 mmol) of Monomer M-1 were dissolved to prepare a monomer solution. After heating 10% by mass of the prepared monomer solution to 75° C. under a flow of argon gas, a solution prepared by dissolving 0.078 g (0.48 mmol) of 2,2'-azoiso(butyronitrile) (available from Tokyo Chemical Industry Co., Ltd.) and 0.016 g (0.15 mmol) of 3-mercaptopropionic acid in the rest of the monomer solution was dripped over 2 hours, followed by stirring for 4 hours at 75° C. After cooling the resultant to room temperature (25° C.), the obtained resultant reaction solution was added to hexane. The precipitate was collected through filtration, followed by drying under reduced pressure, to thereby obtain 8.33 g of Copolymer CP-5 (number average molecular weight (Mn): 10,400, weight average molecular weight (Mw): 20,900).

Subsequently, 2.00 g of obtained Copolymer CP-5 was dissolved in a tetraethyl ammonium hydroxide aqueous solution in a manner that a concentration of Copolymer CP-5 was to be 2.38% and pH was to be 8.0, to thereby prepare an aqueous solution of Copolymer CP-5 for dispersing a pigment.

Example 6

Synthesis of Copolymer CP-6

In 40 mL of methyl ethyl ketone, 1.07 g (14.8 mmol) of acrylic acid (available from Tokyo Chemical Industry Co., Ltd.) and 7.00 g (14.8 mmol) of Monomer M-1 were dissolved to prepare a monomer solution. After heating 10% by mass of the prepared monomer solution to 75° C. under a flow of argon gas, a solution prepared by dissolving 0.085 g (0.52 mmol) of 2,2'-azoiso(butyronitrile) (available from Tokyo Chemical Industry Co., Ltd.) and 0.018 g (0.17 mmol) of 3-mercaptopropionic acid in the rest of the monomer solution was dripped over 2 hours, followed by stirring for 4 hours at 75° C. After cooling the resultant to room temperature (25° C.), the obtained resultant reaction solution was added to hexane. The precipitate was collected through filtration, followed by drying under reduced pressure, to thereby obtain 7.94 g of Copolymer CP-6 (number average molecular weight (Mn): 10,900, weight average molecular weight (Mw): 20,900).

Subsequently, 2.00 g of obtained Copolymer CP-6 was dissolved in a tetraethyl ammonium hydroxide aqueous solution in a manner that a concentration of Copolymer CP-6 was to be 2.38% and pH was to be 8.0, to thereby prepare an aqueous solution of Copolymer CP-6.

Example 7

Synthesis of Copolymer CP-7

In 40 mL of methyl ethyl ketone, 2.53 g (35.1 mmol) of acrylic acid (available from Tokyo Chemical Industry Co., Ltd.) and 5.52 g (11.7 mmol) of Monomer M-1 were dissolved to prepare a monomer solution. After heating 10% by mass of the prepared monomer solution to 75° C. under a flow of argon gas, a solution prepared by dissolving 0.192 g (1.17 mmol) of 2,2'-azoiso(butyronitrile) (available from Tokyo Chemical Industry Co., Ltd.) and 0.040 g (0.37 mmol) of 3-mercaptopropionic acid in the rest of the monomer solution was dripped over 2 hours, followed by stirring for 4 hours at 75° C. After cooling the resultant to room temperature (25° C.), the obtained resultant reaction solution was added to hexane. The precipitate was collected through filtration, followed by drying under reduced pressure, to thereby obtain 7.93 g of Copolymer CP-7 (number average molecular weight (Mn): 11,000, weight average molecular weight (Mw): 21,000).

Subsequently, 2.00 g of obtained Copolymer CP-7 was dissolved in a tetraethyl ammonium hydroxide aqueous solution in a manner that a concentration of Copolymer CP-7 was to be 2.38% by mass and pH was to be 8.0, to thereby prepare an aqueous solution of Copolymer CP-7 for dispersing a pigment.

Example 8

Synthesis of Copolymer CP-8

In 40 mL of methyl ethyl ketone, 3.06 g (42.5 mmol) of acrylic acid (available from Tokyo Chemical Industry Co., Ltd.) and 5.01 g (10.6 mmol) of Monomer M-1 were dissolved to prepare a monomer solution. After heating 10% by mass of the prepared monomer solution to 75° C. under a flow of argon gas, a solution prepared by dissolving 0.218 g (1.33 mmol) of 2,2'-azoiso(butyronitrile) (available from Tokyo Chemical Industry Co., Ltd.) and 0.045 g (0.43 mmol) of 3-mercaptopropionic acid in the rest of the monomer solution was dripped over 2 hours, followed by stirring for 4 hours at 75° C. After cooling the resultant to room temperature (25° C.), the obtained resultant reaction solution was added to hexane. The precipitate was collected through filtration, followed by drying under reduced pressure, to thereby obtain 7.96 g of Copolymer CP-8 (number average molecular weight (Mn): 11,300, weight average molecular weight (Mw): 21,200).

Subsequently, 2.00 g of obtained Copolymer CP-8 was dissolved in a tetraethyl ammonium hydroxide aqueous solution in a manner that a concentration of Copolymer CP-8 was to be 2.38% by mass and pH was to be 8.0, to thereby prepare an aqueous solution of Copolymer CP-8 for dispersing a pigment.

Example 9

Synthesis of Copolymer CP-9

In a sodium hydroxide aqueous solution, 2.00 g of Copolymer CP-1 (number average molecular weight (Mn): 10,200, weight average molecular weight (Mw): 20,500) obtained in Example 1 was dissolved in a manner that a concentration of Copolymer CP-1 was to be 2.38% by mass and pH was to be 8.0, to thereby prepare an aqueous solution of Copolymer CP-9 for dispersing a pigment.

Example 10

Synthesis of Copolymer CP-10

In 40 mL of methyl ethyl ketone, 4.70 g (54.6 mmol) of methacrylic acid (available from Tokyo Chemical Industry Co., Ltd.) and 3.34 g (5.46 mmol) of Monomer M-4 were dissolved to prepare a monomer solution. After heating 10% by mass of the prepared monomer solution to 75° C. under a flow of argon gas, a solution prepared by dissolving 0.247 g (0.40 mmol) of 2,2'-azoiso(butyronitrile) (available from Tokyo Chemical Industry Co., Ltd.) and 0.510 g (4.80 mmol) of 3-mercaptopropionic acid in the rest of the monomer solution was dripped over 2 hours, followed by stirring for 4 hours at 75° C. After cooling the resultant to room temperature (25° C.), the obtained resultant reaction solution was added to hexane. The precipitate was collected through filtration, followed by drying under reduced pressure, to thereby obtain 7.92 g of Copolymer CP-10 (number average molecular weight (Mn): 9,800, weight average molecular weight (Mw): 20,800).

Subsequently, 2.00 g of obtained Copolymer CP-10 was dissolved in a sodium hydroxide aqueous solution in a manner that a concentration of the copolymer was to be 2.38% by mass and pH was to be 8.0, to thereby prepare an aqueous solution of Copolymer CP-10 for dispersing a pigment.

Example 11

Synthesis of Copolymer CP-11

In 1.83 g (25.4 mmol) of acrylic acid, 59.9 g (127 mmol) of Monomer M-1 was dissolved. To the resultant solution, 100 g of ion-exchanged water, 3.00 g of Aqualon KH-10 (anionic radical reactive surfactant, available from DKS Co, Ltd.), and 1.00 g of ammonium persulfate were added, and the mixture was mixed by a homomixer to form a pre-emulsion. Subsequently, 2.00 g of Aqualon KH-10 was added to 100 g of ion-exchanged water, and the mixture was heated to 80° C. under a flow of argon gas. Thereafter, 10% by mass of the pre-emulsion was added to the mixture to perform initial polymerization for 30 minutes.

Subsequently, the rest of the pre-emulsion was dripped to the reaction solution over 2 hours to perform polymerization, followed by further polymerizing for 2 hours at 80° C. After cooling the resultant reaction solution, the reaction solution was filtered, and neutralized with ammonia water to thereby obtain an O/W emulsion of Copolymer CP-11 (number average molecular weight (Mn): 16,500, weight average molecular weight (Mw): 38,000) for adding having a solid content of 30% by mass.

Example 12

Synthesis of Copolymer CP-12

In 4.77 g (55.4 mmol) of methacrylic acid, 65.3 g (139 mmol) of Monomer M-1 was dissolved. To the resultant solution, 130 g of ion-exchanged water, 4.00 g of Aqualon KH-10 (anionic radical reactive surfactant, available from DKS Co, Ltd.), and 1.30 g of ammonium persulfate were added, and the mixture was mixed by a homomixer to form a pre-emulsion. Subsequently, 2.00 g of Aqualon KH-10 was added to 100 g of ion-exchanged water, and the mixture was heated to 80° C. under a flow of argon gas. Thereafter, 10% by mass of the pre-emulsion was added to the mixture to perform initial polymerization for 30 minutes. Subsequently, the rest of the pre-emulsion was dripped to the reaction solution over 2 hours to perform polymerization, followed by further polymerizing for 2 hours at 80° C. After cooling the resultant reaction solution, the reaction solution was filtered, and neutralized with ammonia water to thereby obtain an O/W emulsion of Copolymer CP-12 (number average molecular weight (Mn): 17,400, weight average molecular weight (Mw): 39,200) for adding having a solid content of 30% by mass.

The structures, polymerization methods, number average molecular weights, and weight average molecular weights of the copolymers of Examples 1 to 12 are summarized in Table 1.

Comparative Example 1

Preparation of Copolymer RCP-1

Copolymer RCP-1 (number average molecular weight (Mn): 8,600, weight average molecular weight (Mw): 18,800) in an amount of 4.82 g was obtained in the same manner as in the synthesis of Copolymer CP-1, except that 7.01 g (14.9 mmol) of Monomer M-1 was replaced with 4.69 g (14.9 mmol) of a monomer represented by Structural Formula (5) below.

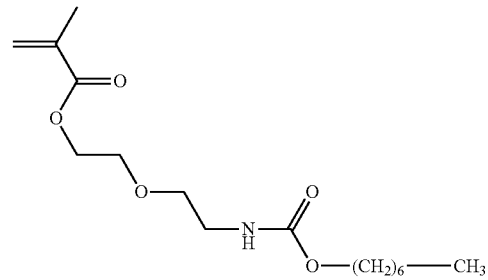

Structural Formula (5)

Comparative Example 2

Synthesis of Copolymer RCP-2

In 160 mL of tetrahydrofuran (THF), 80 g of 2-phenoxyethylmethacrylate serving as a monomer, 3.7 g of 3-mercapto-1-propanol serving as a chain-transfer agent, and 0.3 g of 2,2-azobis(2,4-dimethylvaleronitrile) serving as an initiator were dissolved. The resultant solution was heated to 65° C. in a nitrogen atmosphere to react for 7 hours. After cooling the obtained solution, 80 mg of dibutyltin dilaurate and a catalytic amount of hydroquinone were added to the solution, and 10.0 g of 2-methacryloyloxyethyl isocyanate was dripped. The resultant was heated to 50° C. and was allowed to react for 2.5 hours. Thereafter, the reaction solution was purified through reprecipitation using a mixed solvent of methanol and water, to thereby obtain 71 g of Macromonomer MM-1 (number average molecular weight (Mn): 1,900, weight average molecular weight (Mw): 4,000).

Subsequently, 20 g of methyl ethyl ketone was heated to 75° C. in a nitrogen atmosphere, followed by dripping thereto a solution prepared by dissolving 1.16 g of dimethyl-2,2'-azobisisobutylate, 9 g of Macromonomer MM-1 obtained above, 1.8 g of p-styrene sulfonic acid, and 49.2 g of methyl methacrylate in 40 g of methyl ethyl ketone over 3 hours. After completing the dripping, the resultant was further allowed to react for 1 hour. Thereafter, a solution prepared by dissolving 0.2 g of dimethyl-2,2'-azobisisobutylate in 0.6 g of methyl ethyl ketone was added to the reaction solution, and the resulting mixture was heated to 80° C., and heated for 4 hours with stirring. A solution prepared by dissolving 0.2 g of dimethyl-2,2'-azobisisobutylate in 0.6 g of methyl ethyl ketone was further added to the reaction solution, and the resultant mixture was heated for 6 hours with stirring. After cooling the obtained reaction solution, the reaction solution was added to hexane. The precipitated graft polymer was collected through filtration, and dried to thereby obtain 58.5 g of Copolymer RCP-2

(number average molecular weight (Mn): 11,000, weight average molecular weight (Mw): 22,500).

Comparative Example 3

Synthesis of Copolymer RCP-3

An O/W emulsion of Copolymer RCP-3 (solid content: 30% by mass, number average molecular weight (Mn): 12,200, weight average molecular weight (Mw): 25,600) in an amount of 650 g was obtained in the same manner as in the synthesis of Copolymer CP-12, except that 65.3 g (139 mmol) of Monomer M-1 was replaced with 65.3 g (207 mmol) of a monomer represented by Structural Formula (5).

TABLE 1

|  | Copolymer | Molar ratio (M1/M2) | R | X | L | Polymerization method | Mn | Mw |
|---|---|---|---|---|---|---|---|---|
| Example | 1 CP-1 | 1.4/1 | H | TEA | —$(CH_2)_6$— | solution polymerization | 10,200 | 20,500 |
|  | 2 CP-2 | 1.4/1 | H | TEA | —$(CH_2)_2$— | solution polymerization | 9,400 | 19,200 |
|  | 3 CP-3 | 1.4/1 | H | TEA | —$(CH_2)_{12}$— | solution polymerization | 10,900 | 22,100 |
|  | 4 CP-4 | 1.4/1 | H | TEA | —$(CH_2)_{16}$— | solution polymerization | 10,700 | 22,600 |
|  | 5 CP-5 | 1.4/1 | $CH_3$ | TEA | —$(CH_2)_6$— | solution polymerization | 10,400 | 20,900 |
|  | 6 CP-6 | 1/1 | H | TEA | —$(CH_2)_6$— | solution polymerization | 10,900 | 20,900 |
|  | 7 CP-7 | 3/1 | H | TEA | —$(CH_2)_6$— | solution polymerization | 11,000 | 21,000 |
|  | 8 CP-8 | 4/1 | H | TEA | —$(CH_2)_6$— | solution polymerization | 11,300 | 21,200 |
|  | 9 CP-9 | 1.4/1 | H | $Na^+$ | —$(CH_2)_6$— | solution polymerization | 10,200 | 20,500 |
|  | 10 CP-10 | 10/1 | $CH_3$ | $Na^+$ | —$(CH_2)_{16}$— | solution polymerization | 9,800 | 20,800 |
|  | 11 CP-11 | 0.2/1 | H | TEA | —$(CH_2)_6$— | emulsion polymerization | 16,500 | 38,000 |
|  | 12 CP-12 | 0.4/1 | $CH_3$ | TEA | —$(CH_2)_6$— | emulsion polymerization | 17,400 | 39,200 |

Note that, in Table 1, TEA denotes a tetraethyl ammonium ion, Mn denotes a number average molecular weight, and Mw denotes a weight average molecular weight.

Example 13

Preparation of Coloring Material Dispersion PD-1

To 84.0 parts by mass of an aqueous solution of Copolymer CP-1, 16.0 parts by mass of carbon black (NIPEX150, available from Degussa) was added, and the mixture was stirred for 12 hours. The obtained mixture was circulated and dispersed for 1 hour by means of a disk-type bead mill (KDL-type, available from SHINMARU ENTERPRISES CORPORATION, media: using zirconia balls having diameters of 0.1 mm) at the rim speed of 10 m/s. Thereafter, the resultant was filtered with a membrane filter (product name: Minisart (registered trademark), available from Sartorius Stedim Biotech S.A.) having the average opening diameter of 5.0 μm. To the resultant, an adjusted amount of ion-exchanged water was added, to thereby obtain 95.0 parts by mass of Coloring Material Dispersion PD-1 (coloring material solid content: 16% by mass).

Example 14

Preparation of Coloring Material Dispersion PD-2

Coloring Material Dispersion PD-2 was obtained in the same manner as in the preparation of Coloring Material Dispersion PD-1, except that the aqueous solution of Copolymer CP-1 was replaced with an aqueous solution of Copolymer CP-2.

Example 15

Preparation of Coloring Material Dispersion PD-3

Coloring Material Dispersion PD-3 was obtained in the same manner as in the preparation of Coloring Material Dispersion PD-1, except that the aqueous solution of Copolymer CP-1 was replaced with an aqueous solution of Copolymer CP-3.

Example 16

Preparation of Coloring Material Dispersion PD-4

Coloring Material Dispersion PD-4 was obtained in the same manner as in the preparation of Coloring Material Dispersion PD-1, except that the aqueous solution of Copolymer CP-1 was replaced with Copolymer CP-4.

Example 17

Preparation of Coloring Material Dispersion PD-5

Coloring Material Dispersion PD-5 was obtained in the same manner as in the preparation of Coloring Material Dispersion PD-1, except that the aqueous solution of Copolymer CP-1 was replaced with Copolymer CP-5.

Example 18

Preparation of Coloring Material Dispersion PD-6

Coloring Material Dispersion PD-6 was obtained in the same manner as in the preparation of Coloring Material Dispersion PD-1, except that the aqueous solution of Copolymer CP-1 was replaced with an aqueous solution of Copolymer CP-6.

Example 19

Preparation of Coloring Material Dispersion PD-7

Coloring Material Dispersion PD-7 was obtained in the same manner as in the preparation of Coloring Material Dispersion PD-1, except that the aqueous solution of Copolymer CP-1 was replaced with an aqueous solution of Copolymer CP-7.

Example 20

Preparation of Coloring Material Dispersion PD-8

Coloring Material Dispersion PD-8 was obtained in the same manner as in the preparation of Coloring Material Dispersion PD-1, except that the aqueous solution of Copolymer CP-1 was replaced with an aqueous solution of Copolymer CP-8.

Example 21

Preparation of Coloring Material Dispersion PD-9

Coloring Material Dispersion PD-9 was obtained in the same manner as in the preparation of Coloring Material Dispersion PD-1, except that the aqueous solution of Copolymer CP-1 was replaced with an aqueous solution of Copolymer CP-9.

Example 22

Preparation of Coloring Material Dispersion PD-10

Coloring Material Dispersion PD-10 was obtained in the same manner as in the preparation of Coloring Material Dispersion PD-1, except that the aqueous solution of Copolymer CP-1 was replaced with an aqueous solution of Copolymer CP-10.

Example 23

Preparation of Coloring Material Dispersion PD-11

Coloring Material Dispersion PD-11 was obtained in the same manner as in the preparation of Coloring Material Dispersion PD-1, except that carbon black (NIPEX150, available from Degussa), whose pigment solid content was 16% by mass, was replaced with Pigment Blue 15:3 (CHROMOFINE BLUE, cyan pigment, available from Dainichiseika Color & Chemicals Mfg. Co., Ltd.), whose coloring material solid content was 20.0% by mass.

Example 24

Preparation of Coloring Material Dispersion PD-12

Coloring Material Dispersion PD-12 was obtained in the same manner as in the preparation of Coloring Material Dispersion PD-1, except that carbon black (NIPEX150, available from Degussa), whose pigment solid content was 16% by mass, was replaced with Pigment Red 122 (Toner Magenta E002, magenta pigment, available from Clariant Japan K.K.), whose coloring material solid content was 20.0% by mass.

Example 25

Preparation of Coloring Material Dispersion PD-13

Coloring Material Dispersion PD-13 was obtained in the same manner as in the preparation of Coloring Material Dispersion PD-1, except that carbon black (NIPEX150, available from Degussa), whose pigment solid content was 16% by mass, was replaced with Pigment Yellow (Fast Yellow 531, yellow pigment, available from Dainichiseika Color & Chemicals Mfg. Co., Ltd.), whose coloring material solid content was 20.0% by mass.

Comparative Example 4

Preparation of Coloring Material Dispersion RPD-1

Coloring Material Dispersion RPD-1 was obtained in the same manner as in the preparation of Coloring Material Dispersion PD-1, except that the aqueous solution of Copolymer CP-1 was replaced with Copolymer RCP-1.

Comparative Example 5

Preparation of Coloring Material Dispersion RPD-2

Coloring Material Dispersion RPD-2 was obtained in the same manner as in the preparation of Coloring Material Dispersion PD-11, except that the aqueous solution of Copolymer CP-1 was replaced with Copolymer RCP-1.

Comparative Example 6

Preparation of Coloring Material Dispersion RPD-3

Coloring Material Dispersion RPD-3 was obtained in the same manner as in the preparation of Coloring Material Dispersion PD-12, except that the aqueous solution of Copolymer CP-1 was replaced with Copolymer RCP-1.

Comparative Example 7

Preparation of Coloring Material Dispersion RPD-4

Coloring Material Dispersion RPD-4 was obtained in the same manner as in the preparation of Coloring Material Dispersion PD-13, except that the aqueous solution of Copolymer CP-1 was replaced with Copolymer RCP-1.

Comparative Example 8

Preparation of Coloring Material Dispersion RPD-5

Coloring Material Dispersion RPD-5 was obtained in the same manner as in the preparation of Coloring Material Dispersion PD-1, except that the aqueous solution of Copolymer CP-1 was replaced with Copolymer RCP-2.

The obtained coloring material dispersions were evaluated in terms of storage stability in the following manner.

The results of the coloring material dispersions are summarized in Table 2.

(Storage Stability of Coloring Material Dispersion)

Each coloring material dispersion was poured into a glass container (product name: screw tube SCC, available from Wakayama CIC Research Institute) and was stored for 2 weeks at 70° C. A change rate of the viscosity of the coloring material dispersion after the storage relative to the viscosity before the storage was determined from an equation below, and "storage stability of the coloring material dispersion" was evaluated based on evaluation criteria below. The results are presented in Table 2.

$$\text{Viscosity change rate (\%)} = \frac{\text{Viscosity of } CMD \text{ before storage} - \text{viscosity of } CMD \text{ after storage}}{\text{Viscosity of } CMD \text{ before storage}} \times 100$$

In the equation above, CMD denotes a coloring material dispersion.

Note that, a viscometer (RE80L, TOKI SANGYO CO., LTD.) was used for the measurement of the viscosity, and the viscosity at 25° C. was measured with 50 rotations.

[Evaluation Criteria]
A: The change rate of the viscosity was within ±5%.
B: The change rate of the viscosity was greater than ±5% but within ±8%.
C: The change rate of the viscosity was greater than ±8% but within ±10%.
D: The change rate of the viscosity was greater than ±10% but within ±30%.
E: The change rate of the viscosity was greater than ±30% (it was impossible to evaluate because the dispersion was gelated).

TABLE 2

|  |  | Coloring material dispersion | Co-polymer | Coloring material | Evaluation result Storage stability of coloring material dispersion |
|---|---|---|---|---|---|
| Ex. | 13 | PD-1 | CP-1 | Carbon black | A |
|  | 14 | PD-2 | CP-2 | Carbon black | A |
|  | 15 | PD-3 | CP-3 | Carbon black | A |
|  | 16 | PD-4 | CP-4 | Carbon black | A |
|  | 17 | PD-5 | CP-5 | Carbon black | A |
|  | 18 | PD-6 | CP-6 | Carbon black | A |
|  | 19 | PD-7 | CP-7 | Carbon black | A |
|  | 20 | PD-8 | CP-8 | Carbon black | A |
|  | 21 | PD-9 | CP-9 | Carbon black | B |
|  | 22 | PD-10 | CP-10 | Carbon black | B |
|  | 23 | PD-11 | CP-1 | Cyan pigment | A |
|  | 24 | PD-12 | CP-1 | Magenta pigment | A |
|  | 25 | PD-13 | CP-1 | Yellow pigment | A |
| Comp. Ex. | 4 | RPD-1 | RCP-1 | Carbon black | C |
|  | 5 | RPD-2 | RCP-1 | Cyan pigment | C |
|  | 6 | RPD-3 | RCP-1 | Magenta pigment | C |
|  | 7 | RPD-4 | RCP-1 | Yellow pigment | C |
|  | 8 | RPD-5 | RCP-2 | Carbon black | C |

The coloring material dispersions of Examples 13 to 25, each of which was produced using the copolymer of the present disclosure including a naphthyl group at a terminal of the side chain had excellent storage stability compared to the coloring material dispersions of Comparative Examples 4 to 8, each of which was produced using the copolymer having no naphthyl group at a terminal of the side chain. It was assumed that the adsorption of the coloring material dispersion to the pigment was enhanced owing to the π-π interaction between the naphthyl group of the copolymer and the pigment.

Example 26

Preparation of Ink GJ-1

Coloring Material Dispersion PD-1 (45.0 parts by mass), 10.0 parts by mass of 1,3-butanediol, 10.0 parts by mass of glycerin, 10.0 parts by mass of 3-methoxy-N,N-dimethyl-propione amide, 1.0 part by mass of ZONYL FS-300 (available from DuPont, fluoro surfactant, solid content: 40% by mass), and 24.0 parts by mass of ion-exchanged water were mixed, and the resulting mixture was stirred for 1 hour. Thereafter, the resultant was filtered with a membrane filter (product name: DISMIC (registered trademark)-25cs Cellulose Acetate 0.80 μm, available from Toyo Roshi Kaisha, Ltd.) having the average opening diameter of 0.8 μm, to thereby obtain Ink GJ-1.

Example 27

Preparation of Ink GJ-2

Ink GJ-2 was obtained in the same manner as in the preparation of Ink GJ-1, except that Coloring Material Dispersion PD-1 was replaced with Coloring Material Dispersion PD-2.

Example 28

Preparation of Ink GJ-3

Ink GJ-3 was obtained in the same manner as in the preparation of Ink GJ-1, except that Coloring Material Dispersion PD-1 was replaced with Coloring Material Dispersion PD-3.

Example 29

Preparation of Ink GJ-4

Ink GJ-4 was obtained in the same manner as in the preparation of Ink GJ-1, except that Coloring Material Dispersion PD-1 was replaced with Coloring Material Dispersion PD-4.

Example 30

Preparation of Aqueous Ink GJ-5

Ink GJ-5 was obtained in the same manner as in the preparation of Ink GJ-1, except that Coloring Material Dispersion PD-1 was replaced with Coloring Material Dispersion PD-5.

Example 31

Preparation of Ink GJ-6

Ink GJ-6 was obtained in the same manner as in the preparation of Ink GJ-1, except that Coloring Material Dispersion PD-1 was replaced with Coloring Material Dispersion PD-6.

Example 32

Preparation of Ink GJ-7

Ink GJ-7 was obtained in the same manner as in the preparation of Ink GJ-1, except that Coloring Material Dispersion PD-1 was replaced with Coloring Material Dispersion PD-7.

Example 33

Preparation of Aqueous Ink GJ-8

Ink GJ-8 was obtained in the same manner as in the preparation of Ink GJ-1, except that Coloring Material Dispersion PD-1 was replaced with Coloring Material Dispersion PD-8.

Example 34

Preparation of Ink GJ-9

Ink GJ-9 was obtained in the same manner as in the preparation of Ink GJ-1, except that Coloring Material Dispersion PD-1 was replaced with Coloring Material Dispersion PD-9.

Example 35

Preparation of Ink GJ-10

Ink GJ-10 was obtained in the same manner as in the preparation of Ink GJ-1, except that Coloring Material Dispersion PD-1 was replaced with Coloring Material Dispersion PD-10.

Example 36

Preparation of Ink GJ-11

Coloring Material Dispersion PD-11 (30.0 parts by mass), 15.0 parts by mass of 1,3-butanediol, 10.0 parts by mass of glycerin, 20.0 parts by mass of 3-methoxy-N,N-dimethylpropione amide, 1.0 part by mass of ZONYL FS-300 (available from DuPont, fluoro surfactant, solid content: 40% by mass), and 24.0 parts by mass of ion-exchanged water were mixed, and the resulting mixture was stirred for 1 hour. Thereafter, the resultant was filtered with a membrane filter (product name: DISMIC (registered trademark)-25cs Cellulose Acetate 0.80 µm, available from Toyo Roshi Kaisha, Ltd.) having the average opening diameter of 0.8 µm, to thereby obtain Ink GJ-11.

Example 37

Preparation of Ink GJ-12

Ink GJ-12 was obtained in the same manner as in the preparation of Ink GJ-1, except that Coloring Material Dispersion PD-1 was replaced with Coloring Material Dispersion PD-12.

Example 38

Preparation of Ink GJ-13

Ink GJ-13 was obtained in the same manner as in the preparation of Ink GJ-11, except that Coloring Material Dispersion PD-11 was replaced with Coloring Material Dispersion PD-13.

Example 39

Preparation of Ink GJ-14

The following materials were mixed and stirred for 30 minutes to prepare Aqueous Solution 1. To Aqueous Solution 1, 37.50 parts by mass of a carbon black coloring material dispersion (solid content: 20.0% by mass, IJX2440K available from Cabot Corporation) was added, and the resultant mixture was stirred for 10 minutes.

| | |
|---|---|
| 2-ethyl-1,3-hexanediol | 2.00 parts by mass |
| glycerol | 10.00 parts by mass |
| 3-methoxy-N,N-dimethylpropaneamide | 15.00 parts by mass |
| 3-butoxy-N,N-dimethylpropaneamide | 15.00 parts by mass |
| 2-(cyclohexylamino)ethanesulfonic acid | 0.05 parts by mass |
| 2,4,7,9-tetramethyl-4,7-decanediol | 0.50 parts by mass |
| ZONYL FS-300 (available from DuPont, fluoro surfactant) | 0.25 parts by mass |
| diethanolamine | 0.01 parts by mass |
| ion-exchanged water | 12.93 parts by mass |

Subsequently, 6.67 parts by mass of Copolymer CP-11 emulsion (solid content: 30% by mass) was added to the mixture above, and the resultant was stirred for 20 minutes. The obtained mixture was filtered with a membrane filter (product name: DISMIC (registered trademark)-25cs Cellulose Acetate 0.80 µm, available from Toyo Roshi Kaisha, Ltd.) having the average opening diameter of 0.8 µm to obtain Ink GJ-14.

Example 40

Preparation of Ink GJ-15

The following materials were mixed and stirred for 30 minutes to prepare Aqueous Solution 2. To Aqueous Solution 2, 22.50 parts by mass of a cyan coloring material dispersion (solid content: 20.0% by mass, IJX2450C available from Cabot Corporation) was added, and the resultant mixture was stirred for 10 minutes.

| | |
|---|---|
| 2-ethyl-1,3-hexanediol | 2.00 parts by mass |
| glycerol | 10.00 parts by mass |
| 3-methoxy-N,N-dimethylpropaneamide | 20.00 parts by mass |
| 3-butoxy-N,N-dimethylpropaneamide | 20.00 parts by mass |
| 2-(cyclohexylamino)ethanesulfonic acid | 0.05 parts by mass |
| 2,4,7,9-tetramethyl-4,7-decanediol | 0.50 parts by mass |
| ZONYL FS-300 | 0.25 parts by mass |

| (available from DuPont, fluoro surfactant) | |
|---|---|
| diethanolamine | 0.01 parts by mass |
| ion-exchanged water | 17.93 parts by mass |

Subsequently, 6.67 parts by mass of Copolymer CP-12 emulsion (solid content: 30% by mass) was added to the mixture above, and the resultant was stirred for 20 minutes. The obtained mixture was filtered with a membrane filter (product name: DISMIC (registered trademark)-25cs Cellulose Acetate 0.80 μm, available from Toyo Roshi Kaisha, Ltd.) having the average opening diameter of 0.8 μm to obtain Ink GJ-15.

Example 41

Preparation of Ink GJ-16

After preparing Aqueous Solution 1 in the same manner as in the preparation of Ink GJ-14, 37.50 parts by mass of a magenta coloring material dispersion (solid content: 20.0% by mass, IJX2465M available from Cabot Corporation) was added to Aqueous Solution 1, and the resultant mixture was stirred for 10 minutes. Subsequently, 6.67 parts by mass of Copolymer CP-12 (solid content: 30% by mass) was added to the mixture, and the resultant was stirred for 20 minutes. The obtained mixture was filtered with a membrane filter (product name: DISMIC (registered trademark)-25cs Cellulose Acetate 0.80 μm, available from Toyo Roshi Kaisha, Ltd.) having the average opening diameter of 0.8 μm to obtain Ink GJ-16.

Example 42

Preparation of Ink GJ-17

After preparing Aqueous Solution 2 was prepared in the same manner as in the preparation of Ink GJ-15, 22.50 parts by mass of Coloring Material Dispersion PD-11 was added to Aqueous Solution 2, and the resultant mixture was stirred for 30 minutes. Thereafter, 6.67 parts by mass of Copolymer CP-12 (solid content: 30% by mass) was added to the mixture, and the resultant was stirred for 30 minutes. The obtained mixture was filtered with a membrane filter (product name: DISMIC (registered trademark)-25cs Cellulose Acetate 0.80 μm, available from Toyo Roshi Kaisha, Ltd.) having the average opening diameter of 0.8 μm to obtain Ink GJ-17.

Comparative Example 9

Ink RGJ-1 was obtained in the same manner as in the preparation of Ink GJ-1, except that Coloring Material Dispersion PD-1 was replaced with Coloring Material Dispersion RPD-1.

Comparative Example 10

Preparation of Ink RGJ-2

Ink RGJ-2 was obtained in the same manner as in the preparation of Ink GJ-11, except that Coloring Material Dispersion PD-11 was replaced with Coloring Material Dispersion RPD-2.

Comparative Example 11

Preparation of Ink RGJ-3

Ink RGJ-3 was obtained in the same manner as in the preparation of Ink GJ-12, except that Coloring Material Dispersion PD-12 was replaced with Coloring Material Dispersion RPD-3.

Comparative Example 12

Preparation of Ink RGJ-4

Ink RGJ-4 was obtained in the same manner as in the preparation of Ink GJ-13, except that Coloring Material Dispersion PD-13 was replaced with Coloring Material Dispersion RPD-4.

Comparative Example 13

Preparation of Ink RGJ-5

Ink RGJ-5 was obtained in the same manner as in the preparation of Ink GJ-1, except that Coloring Material Dispersion PD-1 was replaced with Coloring Material Dispersion RPD-5.

Comparative Example 14

Preparation of Ink RGJ-6

After preparing Aqueous Solution 1 in the same manner as in the preparation of Ink GJ-15, 37.50 parts by mass of a cyan coloring material dispersion (solid content: 20.0% by mass, IJX2465M available from Cabot Corporation) was added to Aqueous Solution 1, and the resultant mixture was stirred for 30 minutes. Thereafter, 6.67 parts by mass of Copolymer RCP-3 (solid content: 30% by mass) was added to the mixture, and the resultant was stirred for 30 minutes. Subsequently, the obtained mixture was filtered with a membrane filter (product name: DISMIC (registered trademark)-25cs Cellulose Acetate 0.80 μm, available from Toyo Roshi Kaisha, Ltd.) having the average opening diameter of 0.8 μm to obtain Ink RGJ-6.

Comparative Example 15

Preparation of Ink RGJ-7

In the same manner as in the preparation of Ink GJ-14, Aqueous solution 1 was prepared, and 37.50 parts by mass of a magenta coloring material dispersion (solid content: 20.0% by mass, IJX2465M, available from Cabot Corporation) was added to Aqueous Solution 1, and the resultant mixture was stirred for 30 minutes. Thereafter, 6.67 parts by mass of Copolymer RCP-3 (solid content: 30% by mass) was added, and the resultant mixture was stirred for 30 minutes. Subsequently, the resultant was filtered through a membrane filter (product name: DISMIC (registered trademark)-25cs Cellulose Acetate 0.80 μm, available from Toyo Roshi Kaisha, Ltd.) having the average opening diameter of 0.8 μm to thereby obtain Ink RGJ-7.

Comparative Example 16

Preparation of Ink RGJ-8

Ink RGJ-8 was obtained in the same manner as in the preparation of Ink GJ-17, except that Coloring Material Dispersion PD-11 and Copolymer CP-12 were replaced with Coloring Material Dispersion RPD-2 (namely a coloring material dispersion including Copolymer RCP-1) and Copolymer RCP-3.

The properties of the inks prepared in Examples and Comparative Examples above were evaluated by the following methods.

The results of the inks are summarized in Tables 3 and 4.

<Storage Stability of Ink>

Each ink was poured into an ink stored container and was stored for 1 week at 70° C. A change rate of the viscosity of the ink after the storage relative to the viscosity before the storage was determined from an equation below, and evaluated based on the following criteria.

$$\text{Viscosity change rate (\%)} = \frac{\text{Viscosity of ink before storage} - \text{viscosity of ink after storage}}{\text{Viscosity of ink before storage}} \times 100$$

Note that, a viscometer (RE80L, TOKI SANGYO CO., LTD.) was used for the measurement of the viscosity, and the viscosity at 25° C. was measured with 50 rotations.

[Evaluation Criteria]
A: The change rate of the viscosity was within ±5%.
B: The change rate of the viscosity was greater than ±5% but within ±8%.
C: The change rate of the viscosity was greater than ±8% but within ±10%.
D: The change rate of the viscosity was greater than ±10% but within ±30%.
E: The change rate of the viscosity was greater than ±30% (it was impossible to evaluate because the dispersion was gelated).

<Image Density>

An inkjet printer (IPSIO GX5000, available from Ricoh Company Limited) was loaded with each ink, and a chart including a general symbol of JIS X 0208 (1997), 2223 with 64 point created by Microsoft Word2000 (available from Microsoft) was printed on Plain Paper 1 (XEROX4200, available from XEROX CORPORATION), and on Plain Paper 2 (MYPAPER, available from Ricoh Company Limited) under the environment of 23° C. and 50% RH. The color of the part of the symbol on the printed surface was measured by means of X-Rite938 (available from X-Rite Inc.) and the result was evaluated on the following evaluation criteria.

As the printing mode, a mode modified to "no color correction" from the "plain paper-standard fast speed" mode in the user setting of plain paper using a driver attached to the printer was used.

Note that, JIS X 0208 (1997), 2223 is a symbol, which has an outer shape of a square and is a symbol whose entire area is filled in with the ink.

[Evaluation Criteria]
A: 1.25 or greater
B: 1.20 or greater but less than 1.25
C: 1.10 or greater but less than 1.20
D: less than 1.10
E: The pigment was gelated and could not be dispersed in the ink, hence printing could not be performed.

<Beading>

The general symbol of JIS X 0208(1997), 2223 was printed in the same manners as in the evaluation of the image density, except that a printing sheet LumiArt Gloss 90GSM (registered trademark) (available from Stora Enso) was used as the print medium, and the printing mode was changed to the "gloss paper-fast" mode, and the result was evaluated based on the following evaluation criteria.

[Evaluation Criteria]
A: The beading did not occur at all, or the beading occurred at less than 10% by area relative to the entire image.
B: The beading occurred at 10% by area or greater but less than 20% by area relative to the entire image.
C: The beading occurred at 20% by area or greater but less than 40% by area relative to the entire image.
D: The beading occurred at 40% by area or greater but less than 90% by area relative to the entire image.
E: The beading occurred at 90% by area or greater relative to the entire image.
F: The pigment was gelated and could not be dispersed in the ink, hence printing could not be performed.

TABLE 3

|  |  | Ink | Coloring material dispersion | Copolymer | Using method | Coloring material |
|---|---|---|---|---|---|---|
| Ex. | 26 | GJ-1 | PD-1 | CP-1 | Pigment dispersion | Carbon black |
|  | 27 | GJ-2 | PD-2 | CP-2 | Pigment dispersion | Carbon black |
|  | 28 | GJ-3 | PD-3 | CP-3 | Pigment dispersion | Carbon black |
|  | 29 | GJ-4 | PD-4 | CP-4 | Pigment dispersion | Carbon black |
|  | 30 | GJ-5 | PD-5 | CP-5 | Pigment dispersion | Carbon black |
|  | 31 | GJ-6 | PD-6 | CP-6 | Pigment dispersion | Carbon black |
|  | 32 | GJ-7 | PD-7 | CP-7 | Pigment dispersion | Carbon black |
|  | 33 | GJ-8 | PD-8 | CP-8 | Pigment dispersion | Carbon black |
|  | 34 | GJ-9 | PD-9 | CP-9 | Pigment dispersion | Carbon black |
|  | 35 | GJ-10 | PD-10 | CP-10 | Pigment dispersion | Carbon black |
|  | 36 | GJ-11 | PD-11 | CP-1 | Pigment dispersion | Cyan pigment |
|  | 37 | GJ-12 | PD-12 | CP-1 | Pigment dispersion | Magenta pigment |
|  | 38 | GJ-13 | PD-13 | CP-1 | Pigment dispersion | Yellow pigment |
|  | 39 | GJ-14 | CB-K | CP-11 | Adding | Carbon black |
|  | 40 | GJ-15 | CB-C | CP-12 | Adding | Cyan pigment |
|  | 41 | GJ-16 | CB-M | CP-12 | Adding | Magenta pigment |
|  | 42 | GJ-17 | PD-11 | CP-1 CP-12 | Pigment dispersion Adding | Cyan pigment |
| Comp. Ex. | 9 | RGJ-1 | RPD-1 | RCP-1 | Pigment dispersion | Carbon black |
|  | 10 | RGJ-2 | RPD-2 | RCP-1 | Pigment dispersion | Cyan pigment |
|  | 11 | RGJ-3 | RPD-3 | RCP-1 | Pigment dispersion | Magenta pigment |
|  | 12 | RGJ-4 | RPD-4 | RCP-1 | Pigment dispersion | Yellow pigment |
|  | 13 | RGJ-5 | RPD-5 | RCP-2 | Pigment dispersion | Carbon black |

TABLE 3-continued

| | Ink | Coloring material dispersion | Copolymer | Using method | Coloring material |
|---|---|---|---|---|---|
| | 14 | RGJ-6 | CB-C | RCP-3 | Adding | Cyan pigment |
| | 15 | RGJ-7 | CB-M | RCP-3 | Adding | Magenta pigment |
| | 16 | RGJ-8 | RPD-2 | RCP-1 RCP-3 | Pigment dispersion Adding | Cyan pigment |

TABLE 4

| | | Evaluation results | | | |
|---|---|---|---|---|---|
| | | Storage stability of ink | Image density | | Beading |
| | | | Plain 1 | Plain 2 | |
| Ex. | 26 | A | A | A | A |
| | 27 | A | A | A | B |
| | 28 | A | A | A | A |
| | 29 | A | A | A | B |
| | 30 | A | A | A | A |
| | 31 | B | A | A | B |
| | 32 | B | A | A | B |
| | 33 | B | A | A | B |
| | 34 | C | A | A | B |
| | 35 | C | A | A | B |
| | 36 | A | A | A | B |
| | 37 | B | A | A | B |
| | 38 | A | A | A | B |
| | 39 | A | A | A | A |
| | 40 | A | A | A | A |
| | 41 | B | A | A | A |
| | 42 | A | A | A | A |
| Comp. Ex. | 9 | D | C | D | C |
| | 10 | D | D | D | D |
| | 11 | D | D | D | D |
| | 12 | D | D | D | D |
| | 13 | E | C | D | F |
| | 14 | D | C | C | C |
| | 15 | E | C | C | C |
| | 16 | E | E | E | F |

The inks of Examples 26 to 38 and 42, each of which was produced using the coloring material dispersion including the copolymer of the present disclosure including a naphthyl group at a terminal of the side chain had the higher storage stability, and excellent properties in terms of the image density and beading compared to the inks of Comparative Examples 9 to 13 and 16, each of which was produced using the coloring material dispersion including the copolymer having no naphthyl group at a terminal of a side chain to be adsorbed on a surface of the pigment.

Moreover, the inks of Examples 39 to 42, each of which was produced by adding the emulsion including the copolymer of the present disclosure including a naphthyl group at a terminal of the side chain were more excellent, especially in terms of beading, than the inks of Comparative Examples 14 to 16, each of which was produced by adding the emulsion including the copolymer having no naphthyl group at a terminal of the side chain. It was assumed that the pigment was immediately aggregated on the surface of the print medium during printing owing to the π-π stacking between the naphthyl group present in the emulsion and the pigment in the ink, and hence beading could be prevented.

For example, embodiments of the present disclosure are as follows.
<1> A copolymer including:
a structural unit represented by General Formula (1) below; and
a structural unit represented by General Formula (2) below,

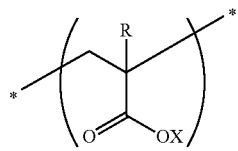

General Formula (1)

where, in General Formula (1), R is a hydrogen atom or a methyl group and X is a hydrogen atom or a cation,

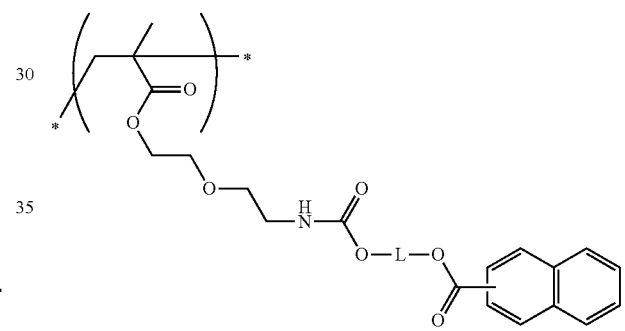

General Formula (2)

where, in General Formula (2), L is an alkylene group having 2 or more but 18 or less carbon atoms.
<2> The copolymer according to <1>, wherein a ratio (M1/M2) of the number of moles (M1) of the structural unit represented by General Formula (1) to the number of moles (M2) of the structural unit represented by General Formula (2) is 1/1 or greater but 3/1 or less.
<3> The copolymer according to <1> or <2>, wherein L in General Formula (2) is an alkylene group having 2 or more but 12 or less carbon atoms.
<4> The copolymer according to any one of <1> to <3>, wherein the copolymer is a polymer prepared by polymerizing a compound represented by General Formula (3) below and a compound represented by General Formula (4) below,

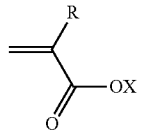

General Formula (3)

where, in General Formula (3), R is a hydrogen atom or a methyl group and X is a hydrogen atom or a cation, General Formula (4)

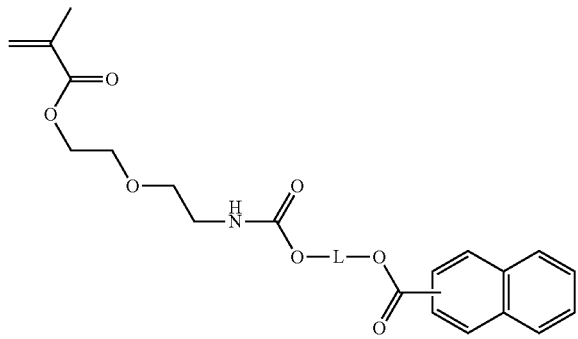

where, in General Formula (4), L is an alkylene group having 2 or more but 18 or less carbon atoms.

<5> The copolymer according to any one of <1> to <4>, wherein the cation of X in General Formula (1) is a tetraethyl ammonium ion.

<6> The copolymer according to any one of <1> to <5>, wherein a number average molecular weight of the copolymer is 500 or greater but 10,000 or less.

<7> The copolymer according to any one of <1> to <6>, wherein a weight average molecular weight of the copolymer is 1,500 or greater but 30,000 or less.

<8> A coloring material dispersion including:
water;
a coloring material; and
a copolymer,
wherein the copolymer is the copolymer according to any one of <1> to <7>.

<9> An ink including:
water;
a coloring material; and
a copolymer,
wherein the copolymer is the copolymer according to any one of <1> to <7>.

<10> The ink according to <9>,
wherein the coloring material is a pigment.

<11> The ink according to <9> or <10>, further including at least one selected from the group consisting of an organic solvent and a surfactant.

<12> The ink according to any one of <9> to <11>, wherein an amount of the coloring material is 0.5% by mass or greater but 20% by mass or less.

<13> The ink according to any one of <9> to <12>, wherein an amount of the surfactant is 0.001% by mass or greater but 5% by mass or less.

<14> The ink according to any one of <9> to <13>, wherein the ink is an inkjet ink.

<15> An ink stored container including:
the ink according to any one of <9> to <14>; and
a container storing the ink.

<16> A method for ejecting a liquid including:
applying stimuli to the ink according to any one of <9> to <14> to discharge the ink to print an image on a print medium.

<17> The method according to <16> further including heating.

<18> The method according to <17>, wherein a heating temperature for the heating is 40° C. or higher but 120° C. or lower.

<19> A device for ejecting a liquid, the device including:
a liquid discharging unit configured to apply stimuli to the ink according to any one of <9> to <14> to discharge the ink to print an image on a print medium.

<20> Printed matter including:
an image printed with the ink according to any one of <9> to <14>.

The copolymer according to any one of <1> to <7>, the coloring material dispersion according to <8>, the ink according to any one of <9> to <14>, the ink stored container according to <15>, the method for ejecting a liquid according to any one of <16> to <18>, the device for ejecting a liquid according to <19>, and the printed matter according to <20> can solve the above-described various problems in the art, and can achieve the object of the present disclosure.

What is claimed is:

1. A copolymer comprising:
a structural unit represented by General Formula (1) below; and
a structural unit represented by General Formula (2) below, General Formula (1)

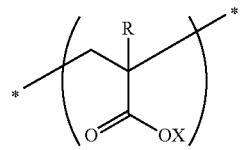

where, in General Formula (1), R is a hydrogen atom or a methyl group and X is a hydrogen atom or a cation, General Formula (2)

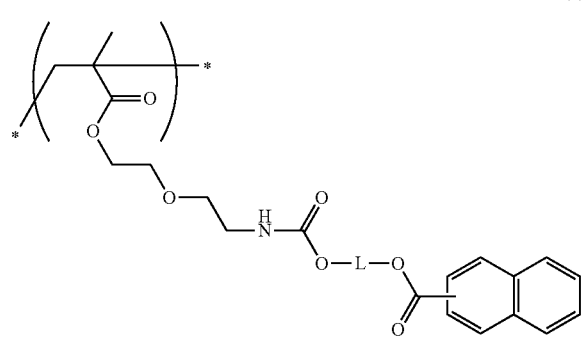

where, in General Formula (2), L is an alkylene group having 2 or more but 18 or less carbon atoms.

2. The copolymer according to claim 1, wherein a ratio (M1/M2) of the number of moles (M1) of the structural unit represented by General Formula (1) to the number of moles (M2) of the structural unit represented by General Formula (2) is 1/1 or greater but 3/1 or less.

3. The copolymer according to claim 1, wherein L in General Formula (2) is an alkylene group having 2 or more but 12 or less carbon atoms.

4. The copolymer according to claim 1, wherein the copolymer is a polymer prepared by polymerizing a compound represented by General Formula (3) below and a compound represented by General Formula (4) below,

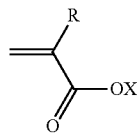

General Formula (3)

where, in General Formula (3), R is a hydrogen atom or a methyl group and X is a hydrogen atom or a cation, General Formula (4)

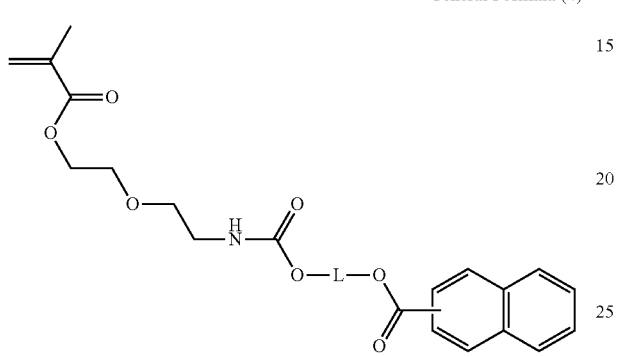

where, in General Formula (4), L is an alkylene group having 2 or more but 18 or less carbon atoms.

5. The copolymer according to claim 1, wherein the cation of X in General Formula (1) is a tetraethyl ammonium ion.

6. A coloring material dispersion comprising:
water;
a coloring material; and
a copolymer,
wherein the copolymer is the copolymer according to claim 1.

7. An ink comprising:
water;
a coloring material; and
a copolymer,
wherein the copolymer is the copolymer according to claim 1.

8. The ink according to claim 7, wherein the coloring material is a pigment.

9. The ink according to claim 7, further comprising at least one selected from the group consisting of an organic solvent and a surfactant.

10. An ink stored container comprising:
the ink according to claim 7; and
a container storing the ink.

* * * * *